(12) United States Patent
Hashimoto et al.

(10) Patent No.: US 8,981,987 B2
(45) Date of Patent: Mar. 17, 2015

(54) IMAGING DEVICE, DRIVING METHOD OF IMAGING DEVICE, AND IMAGING SYSTEM

(71) Applicant: Canon Kabushiki Kaisha, Tokyo (JP)

(72) Inventors: Seiji Hashimoto, Yokohama (JP); Takashi Muto, Kawasaki (JP); Daisuke Yoshida, Ebina (JP); Hirofumi Totsuka, Fujisawa (JP); Yasushi Matsuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/223,319

(22) Filed: Mar. 24, 2014

(65) Prior Publication Data

US 2014/0293085 A1    Oct. 2, 2014

(30) Foreign Application Priority Data

Mar. 28, 2013  (JP) ................. 2013-070544
Jan. 30, 2014  (JP) ................. 2014-016022
Mar. 5, 2014  (JP) ................. 2014-043112

(51) Int. Cl.
*H03M 1/50* (2006.01)
*H03M 1/12* (2006.01)
*H04N 3/14* (2006.01)
*H04N 5/335* (2011.01)
*H04N 5/235* (2006.01)

(52) U.S. Cl.
CPC ................... *H04N 5/235* (2013.01)
USPC ........... 341/167; 341/155; 341/166; 341/169; 348/294; 348/301; 348/302; 348/308

(58) Field of Classification Search
USPC ......... 341/155–172; 348/266–324; 250/208.1
See application file for complete search history.

(56) References Cited

U.S. PATENT DOCUMENTS

| 5,877,715 | A * | 3/1999 | Gowda et al. ................. 341/122 |
| 7,075,474 | B2 * | 7/2006 | Yamagata et al. ............ 341/169 |
| 7,379,011 | B2 * | 5/2008 | Ham et al. .................... 341/170 |
| 7,705,897 | B2 * | 4/2010 | Muramatsu ................... 348/294 |
| 8,253,809 | B2 * | 8/2012 | Nishi ....................... 348/207.99 |
| 8,379,122 | B2 * | 2/2013 | Muramatsu ................... 348/294 |
| 8,421,893 | B2 * | 4/2013 | Kurihara et al. ............. 348/308 |
| 8,773,544 | B2 * | 7/2014 | Koh et al. .................. 348/220.1 |
| 8,866,946 | B2 * | 10/2014 | Taura ........................... 348/294 |
| 2002/0122129 | A1 * | 9/2002 | Lee .............................. 348/308 |
| 2003/0202111 | A1 * | 10/2003 | Park ............................ 348/243 |
| 2005/0253942 | A1 * | 11/2005 | Muramatsu et al. .......... 348/273 |
| 2006/0001564 | A1 * | 1/2006 | Yamagata et al. ............ 341/169 |
| 2006/0012698 | A1 * | 1/2006 | Nitta et al. .................... 348/308 |
| 2006/0097902 | A1 * | 5/2006 | Muramatsu et al. .......... 341/155 |

(Continued)

FOREIGN PATENT DOCUMENTS

JP    2007-281987 A    10/2007

*Primary Examiner* — Michael Osinski
(74) *Attorney, Agent, or Firm* — Canon USA, Inc. IP Division

(57) ABSTRACT

An imaging device includes a comparator that compares a noise signal with each of a first reference signal and a second reference signal having potentials with different changing quantities per unit time, and that compares a photoelectric conversion signal with each of the first reference signal and the second reference signal. Also, the imaging device AD-converts signals obtained by amplifying the noise signal by a first gain and a second gain having different gains, and AD-converts a signal obtained by amplifying the photoelectric conversion signal by one of a first gain and a second gain.

17 Claims, 20 Drawing Sheets

(56) References Cited

U.S. PATENT DOCUMENTS

| | | | |
|---|---|---|---|
| 2006/0284999 A1* | 12/2006 | Muramatsu et al. | 348/308 |
| 2007/0080376 A1* | 4/2007 | Adachi et al. | 257/239 |
| 2008/0042048 A1* | 2/2008 | Asayama et al. | 250/208.1 |
| 2008/0136948 A1* | 6/2008 | Muramatsu | 348/294 |
| 2009/0027533 A1* | 1/2009 | Itakura et al. | 348/308 |
| 2009/0225211 A1* | 9/2009 | Oike | 348/308 |
| 2010/0171853 A1* | 7/2010 | Kondo | 348/294 |
| 2010/0194948 A1* | 8/2010 | Murakami et al. | 348/302 |
| 2010/0253560 A1* | 10/2010 | Kudo | 341/143 |
| 2012/0008032 A1* | 1/2012 | Kurihara et al. | 348/308 |
| 2012/0138775 A1* | 6/2012 | Cheon et al. | 250/208.1 |
| 2013/0026343 A1* | 1/2013 | Saito et al. | 250/208.1 |
| 2013/0063627 A1* | 3/2013 | Hashimoto et al. | 348/241 |
| 2013/0088292 A1* | 4/2013 | Maehashi et al. | 330/124 R |
| 2013/0206961 A1* | 8/2013 | Ikeda et al. | 250/208.1 |
| 2013/0242151 A1* | 9/2013 | Yamazaki | 348/294 |
| 2013/0271633 A1* | 10/2013 | Hashimoto et al. | 348/300 |
| 2014/0146210 A1* | 5/2014 | Lee et al. | 348/302 |
| 2014/0175263 A1* | 6/2014 | Muto et al. | 250/208.1 |
| 2014/0240568 A1* | 8/2014 | Yamagata et al. | 348/308 |
| 2014/0293104 A1* | 10/2014 | Tanaka et al. | 348/301 |

* cited by examiner

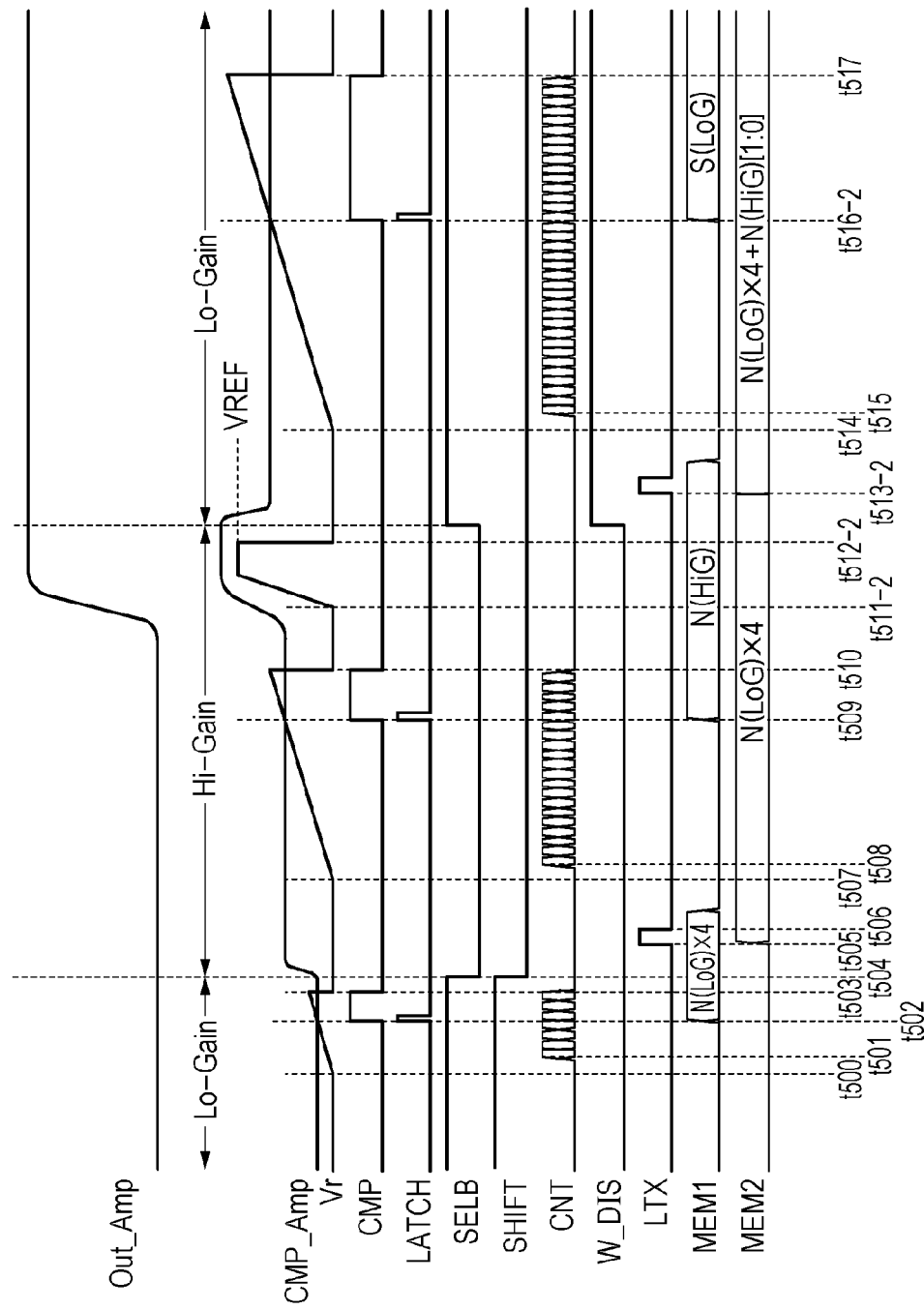

IMAGING DEVICE, DRIVING METHOD OF IMAGING DEVICE, AND IMAGING SYSTEM

BACKGROUND OF THE INVENTION

1. Field of the Invention

The present invention relates to an imaging device and an imaging system including an analog-to-digital (AD) converter that converts a pixel signal output from a pixel into a digital signal. The invention also relates to a driving method of the imaging device.

2. Description of the Related Art

There is an imaging device including an AD converter that converts a pixel signal output from a pixel into a digital signal. An imaging device described in Japanese Patent Laid-Open No. 2007-281987 includes an AD converter corresponding to a pixel column. Also, in the imaging device described in Japanese Patent Laid-Open No. 2007-281987, a pixel outputs a noise signal and a photoelectric conversion signal, which is obtained by executing photoelectric conversion on incident light, to the AD converter. The AD converter of each column includes a first comparator that compares the noise signal with a first reference signal having a potential that is changed by a first changing quantity per unit time, and compares the photoelectric conversion signal with the first reference signal. Further, the AD converter of each column includes a second comparator that compares the noise signal with a second reference signal having a potential, which is changed by a larger second changing quantity per unit time than the first changing quantity, and that compares the photoelectric conversion signal with the second reference signal.

SUMMARY OF THE INVENTION

The present invention provides an imaging device including an analog-signal output unit including a pixel configured to output a photoelectric conversion signal based on incident light; and an analog-to-digital converter including a comparator. The comparator executes first comparison, second comparison, and third comparison. The first comparison is comparison between a noise signal output from the analog-signal output unit and a first reference signal having a potential that is changed by a first changing quantity per unit time. The second comparison is comparison between the noise signal and a second reference signal having a potential that is changed by a second changing quantity per unit time, the second changing quantity being larger than the first changing quantity. The third comparison is comparison between one of the first reference signal and the second reference signal, and a signal output from the analog-signal output unit based on the photoelectric conversion signal. The analog-to-digital converter generates a digital signal based on a result of the first comparison, a digital signal based on a result of the second comparison, and a digital signal based on a result of the third comparison.

The present invention also provides an imaging device including a pixel configured to output a photoelectric conversion signal based on incident light; and an analog-to-digital converter including a comparator configured to compare a reference signal with a signal that is input to an input node of the comparator. The comparator executes first comparison, second comparison, and third comparison. The first comparison is comparison between a reset potential of the input node of the comparator and a first reference signal having a potential that is changed by a first changing quantity per unit time. The second comparison is comparison between the reset potential of the input node of the comparator and a second reference signal having a potential that is changed by a second changing quantity per unit time, the second changing quantity being larger than the first changing quantity. The third comparison is comparison between one of the first reference signal and the second reference signal, and a potential of the input node of the comparator based on the photoelectric conversion signal. The analog-to-digital converter generates a digital signal based on a result of the first comparison, a digital signal based on a result of the second comparison, and a digital signal based on a result of the third comparison.

The present invention also provides an imaging system including the above-described imaging device; and a signal processor configured to process a signal output from the imaging device. If the analog-to-digital converter executes the third comparison by using the first reference signal, the signal output unit generates a signal of a difference between the digital signal generated by the third comparison and the digital signal generated by the first comparison. If the analog-to-digital converter executes the third comparison by using the second reference signal, the signal output unit generates a signal of a difference between the digital signal generated by the third comparison and the digital signal generated by the second comparison.

The present invention also provides an imaging system including the above-described imaging device; and a signal processor configured to process a signal output from the imaging device.

The present invention also provides a driving method of an imaging device, the imaging device including an analog-signal output unit including a pixel configured to output a photoelectric conversion signal based on incident light, and an analog-to-digital converter including a comparator. The method includes a first step of causing the comparator to compare a noise signal output from the analog-signal output unit with a first reference signal having a potential that is changed by a first changing quantity per unit time; a second step of causing the comparator to compare the noise signal with a second reference signal having a potential that is changed by a second changing quantity per unit time, the second changing quantity being larger than the first changing quantity; and a third step of causing the comparator to compare one of the first reference signal and the second reference signal, with a signal based on the photoelectric conversion signal.

Further features of the present invention will become apparent from the following description of exemplary embodiments with reference to the attached drawings.

BRIEF DESCRIPTION OF THE DRAWINGS

FIG. 15B illustrates other operation of the imaging device.

DESCRIPTION OF THE EMBODIMENTS

A technology described in this specification addresses a problem of the imaging device described in Japanese Patent Laid-Open No. 2007-281987, in which the circuit scale is increased because the AD converter of each column includes the first and second comparators.

Described first is an offset, which may be generated if a digital signal based on a noise signal and a digital signal based on a photoelectric conversion signal are generated by using reference signals with different gradients. For easier understanding, a form, in which analog signals with the same signal value are AD-converted by using reference signals with different gradients, is described. Description is given below with reference to FIGS. 1A, 1B, and 2.

Figure 1A:
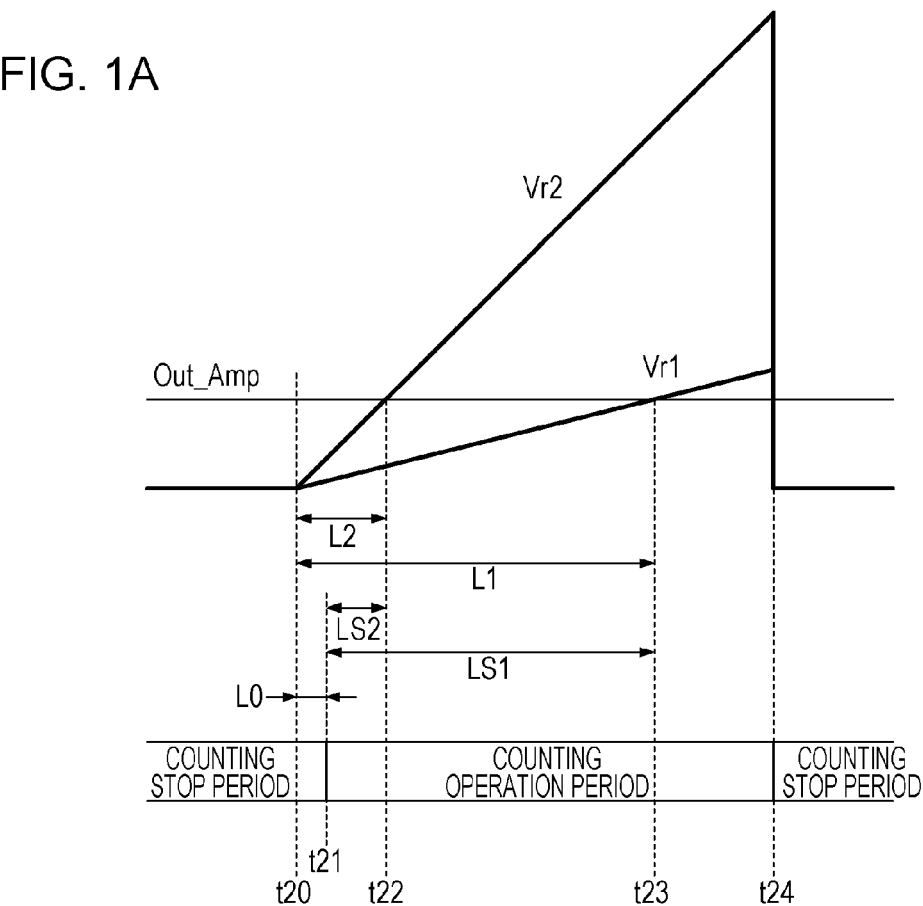
FIGS. 1A and 1B illustrate an example of an offset generated when reference signals with different gradients are used.
Figure 1B:
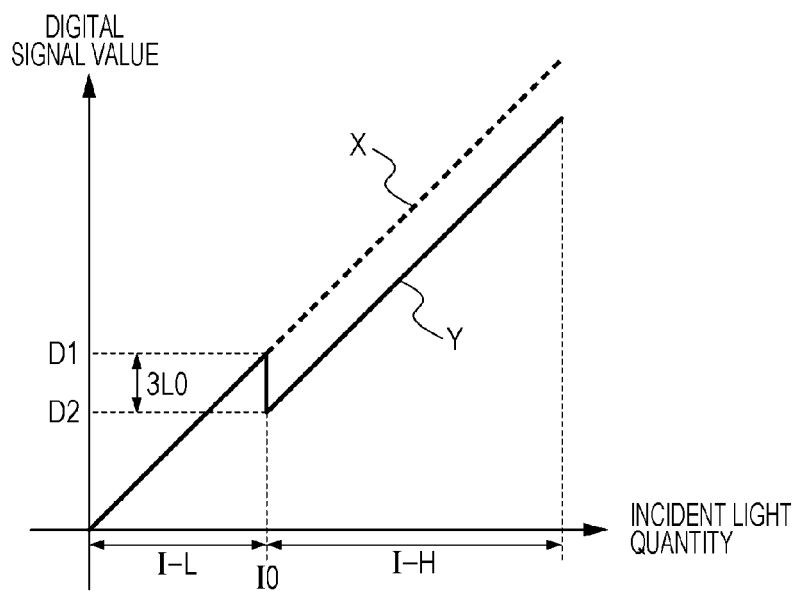
Figure 2:
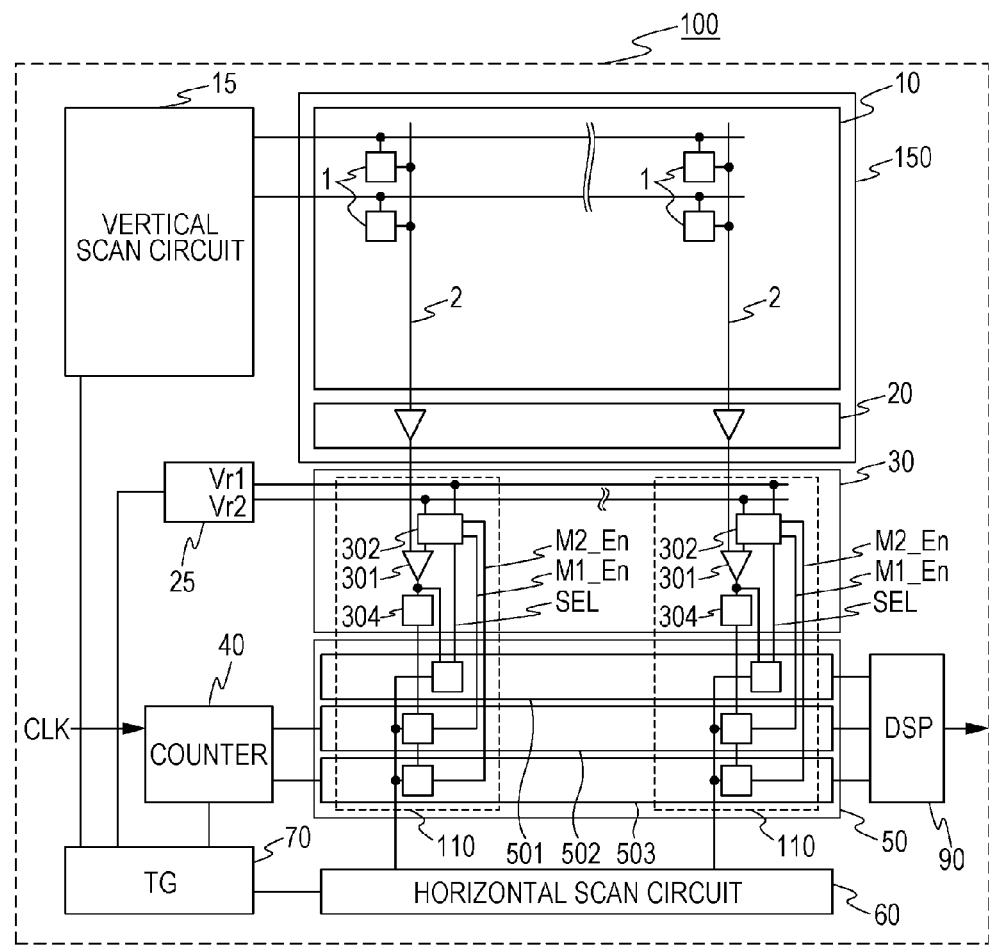
FIG. 2 illustrates an example of an imaging device.

FIG. 2 is a schematic illustration of an imaging device according to a first embodiment (described later). A configuration relating to FIGS. 1A and 1B is described here with reference to FIG. 2, and the detail is described according to the first embodiment.

An imaging device 100 shown in FIG. 2 includes a pixel unit 10 in which a plurality of pixel columns each having pixels 1 and a plurality of pixel rows each having pixels 1 are arranged.

A pixel signal PIXOUT output from the pixel unit 10 is input to an amplifier 20. The amplifier 20 outputs a signal Out_Amp, which is obtained by amplifying the pixel signal PIXOUT, to a comparison circuit 301. The comparison circuit 301 compares reference signals Vr1 and Vr2 output from a reference-signal supply unit 25 with the signal Out_Amp, and outputs a comparison result signal CMP, which indicates the result of comparison, to a latch circuit 304. The latch circuit 304 outputs a latch signal LATCH having a signal value that is changed in accordance with the change in signal value of the comparison result signal CMP, to a memory unit 50. A counter 40 outputs a count signal, which is obtained by counting a clock signal CLK, to the memory unit 50. The memory unit 50 holds the count signal output from the counter 40 when the signal value of the latch signal LATCH is changed.

FIG. 1A is a schematic illustration showing a case in which the signal Out_Amp is compared with each of the reference signals Vr1 and Vr2. At a time t20, the reference-signal supply unit 25 starts changing the potentials of the reference signals Vr1 and Vr2 depending on time. Meanwhile, the counter 40 starts a counting operation of the clock signal at a time t21, which is later than the start of the change in potential of the reference signals Vr1 and Vr2.

If the signal Out_Amp is compared with the reference signal Vr2, the comparison result signal is changed at a time t22. If the signal Out_Amp is compared with the reference signal Vr1, the comparison result signal is changed at a time t23. The time-dependent change in potential of the reference signals Vr1 and Vr2 is stopped at a time t24. Also, the counter 40 stops the counting operation of the clock signal.

First, a form, in which the digital signal is generated by using the reference signal Vr1, is described. A period L1 from when the time-dependent change in potential of the reference signal Vr1 is started to when the signal value of the comparison result signal CMP is changed is as follows.

$$L1 = t23 - t20 \quad (1)$$

A period LS1 from when the counter 40 starts the counting operation of the clock signal to when the signal value of the comparison result signal CMP is changed is as follows.

$$LS1 = t23 - t21 \quad (2)$$

Further, a period L0 from when the time-dependent change in potential of the reference signal Vr2 is started to when the counter 40 starts the operation is as follows.

$$L0 = t21 - t20 \quad (3)$$

LS1 is expressed by using L1 and L0 as follows.

$$LS1 = L1 - L0 \quad (4)$$

The count signal corresponding to the period LS1 is the digital signal generated by using the reference signal Vr1.

Similarly, a form, in which the digital signal is generated by using the reference signal Vr2, is described. A period L2 from when the time-dependent change in potential of the reference signal Vr2 is started to when the signal value of the comparison result signal CMP is changed is as follows.

$$L2 = t22 - t20 \quad (5)$$

A period LS2 from when the counter 40 starts the counting operation of the clock signal to when the signal value of the comparison result signal CMP is changed is as follows.

$$LS2 = t22 - t21 \quad (6)$$

LS2 is expressed by using L2 and L0 as follows.

$$LS2 = L2 - L0 \quad (7)$$

The count signal corresponding to the period LS2 is the digital signal generated by using the reference signal Vr2.

Herein, it is assumed that the changing quantity of potential per unit time of the reference signal Vr1 is quadruple of the changing quantity of potential per unit time of the reference signal Vr2. In this case, the following relationship is established between L1 and L2.

$$L1 = 4 \times L2 \quad (8)$$

To convert the digital signal generated by using the reference signal Vr2 into the digital signal generated by using the reference signal Vr1, the signal value of the digital signal generated by using the reference signal Vr2 is quadrupled. The signal obtained by quadrupling the signal value of the digital signal generated by using the reference signal Vr2 serves as the count signal corresponding to the quadruple period of the period LS2.

Herein, 4LS2, which is the quadruple period of the period LS2, is expressed by using LS1 and L0 as follows.

$$4LS2 = 4L2 - 4L0 = L1 - 4L0 = LS1 - 3L0 \quad (9)$$

In FIG. 1A, the signals having the same signal value and output from the amplifier 20 are converted into the digital signals by using the reference signals Vr1 and Vr2. Hence, the signal value obtained by quadrupling the digital signal obtained by using the reference signal Vr2 corresponds to the signal value of the digital signal obtained by using the reference signal Vr1, ideally. However, as shown in Expression (9), if a difference is present between the start timing of the time-dependent change in potential of the reference signals Vr1 and Vr2, and the start timing of counting of the clock signal by the counter 40, an offset of the count signal corresponding to 3L0 in Expression (9) is generated.

The offset is described with reference to FIG. 1B. Referring to FIG. 1B, a digital signal output from a digital signal processor (DSP) 90 if correction of the first embodiment (described later) is not executed is described. In FIG. 1B, the horizontal axis indicates the light quantity of incident light on a photoelectric converter of the pixel 1, and the vertical axis indicates the signal value of the digital signal output from the DSP 90. X indicates a case in which the digital signal is generated by using the reference signal Vr1. Y indicates a case in which the digital signal is generated by using the reference signal Vr2. I-L is a region where the reference signal Vr1 is the reference signal Vr, which is compared with the signal output from the amplifier 20. I-H is a region where the reference signal Vr2 is the reference signal Vr, which is compared with the signal output from the amplifier 20. The region I-L is a region with a smaller light quantity of the incident light as compared with the region I-H. If the light quantity of the incident light is small, by using the reference signal Vr1, an AD converter 110 can execute AD conversion with a higher resolution as compared with the case of using the reference signal Vr2. In contrast, if the light quantity of the incident light is large, the AD converter 110 executes AD conversion by using the reference signal Vr2. Accordingly, the signal range for analog signals, which can be compared in a period from the time t20 to the time t24, can be expanded as compared with the form, in which the comparison circuit 301 executes the comparison operation by using the reference signal Vr1 in the period from the time t20 to the time t24. IO in FIG. 1B is the boundary between I-L and I-H. The offset of 3L0 is generated at the light quantity value of the boundary IO.

As described above, an offset is generated if AD conversion is executed on analog signals having the same signal value by using reference signals having different gradients. An offset may be generated even if AD conversion is executed on analog signals having different signal values by using reference signals having different gradients. That is, an offset may be generated even if AD conversion is executed on each of signals Out_Amp based on a noise signal and a photoelectric conversion signal, by using reference signals having different gradients. Hence, an offset may be included in the digital signals obtained by subtracting the digital signals based on the noise signals from the digital signals based on the photoelectric conversion signals, generated by using the reference signals having the different gradients.

In the above description, the example is given, in which AD conversion is executed on photoelectric conversion signals having different signal levels, with any of different AD conversion gains, by using the reference signals having different potential changing quantities per unit time. As a unit configured to generate different AD conversion gains, even if an analog signal based on a photoelectric conversion signal is multiplied by different gains, an offset is generated in the digital signals obtained by subtracting the digital signals based on the noise signals from the digital signals based on the photoelectric conversion signals, according to the similar principle.

An imaging device of a portion of this specification executes differential processing between a digital signal based on a photoelectric conversion signal and a digital signal based on a noise signal, the digital signals being generated by using the same AD conversion gain. Also, in another imaging device of this specification, am amplified photoelectric conversion signal and an amplified noise signal are further amplified with the same amplification ratio, the obtained further amplified signals are AD-converted to generate digital signals, and differential processing is executed on the generated digital signals. Accordingly, in an imaging device of each of the embodiments, an offset included in digital signals and described with reference to FIGS. 1A and 1B can be decreased. That is, the imaging device according to any of the embodiments can obtain a digital signal with a less noise component.

First Embodiment

An imaging device of this embodiment is described below with reference to the drawings.

FIG. 2 (described above) is described in further detail. The imaging device 100 includes the pixel unit 10 in which the plurality of pixel columns each having the pixels 1 and the plurality of pixel rows each having the pixels 1 are arranged. Each of the pixels 1 outputs a pixel signal PIXOUT to the amplifier 20 through a vertical signal line 2 by scanning of a vertical scan circuit 15. An analog-signal output unit 150 in this embodiment includes the pixels 1 and the amplifier 20. The pixels 1 include a photoelectric converter that photoelectrically converts incident light. The pixel signal PIXOUT includes a noise-component signal of a pixel and a photoelectric conversion signal output based on a charge obtained by photoelectrically converting incident light. The vertical scan circuit 15 scans each row of the pixels 1 based on a signal output from a timing generator (hereinafter, referred to as TG) 70. The amplifier 20 amplifies the pixel signal PIXOUT and outputs the amplified signal to the comparison circuit 301 included in the comparison unit 30. The amplifier 20 is provided in an electrical path between a comparison unit 30 and the pixels 1. A reference-signal supply unit 25 outputs a plurality of reference signals to a selection circuit 302 of each column. The selection circuit 302 selects a reference signal Vr, which is output to the comparison circuit 301, from among the plurality of reference signals based on a selection signal SEL. The selection signal SEL is a signal generated by a flag memory 501 (described later). Also, the selection circuit 302 outputs signals M1_En and M2_En to a first memory 502 and a second memory 503, respectively. The comparison circuit 301 outputs a comparison result signal CMP, which indicates the result of comparison between the signal output from the amplifier 20 and the reference signal, to the latch circuit 304. The latch circuit 304 outputs a latch signal LATCH having a signal value that is changed in accordance with the change in signal value of the comparison result signal CMP, to a memory unit 50 and the selection circuit 302. The memory unit 50 includes the flag memory 501, the first memory 502, and the second memory 503. The counter 40 outputs a count signal, which is obtained by counting a clock signal CLK, to the first memory 502 and the second memory 503. A horizontal scan circuit 60 causes digital signals held in the flag memory 501, the first memory 502, and the second memory 503 of each column to be successively output to the DSP 90. The DSP 90 processes signals output from the flag memory 501, the first memory 502, and the second memory 503 of each column, and outputs the signals to the outside of the imaging device.

In the imaging device shown in FIG. 2, the AD converter 110 of each column includes the comparison unit 30 and the memory unit 50. Also, the AD converter 110 of each column is provided in correspondence with each column of the pixels 1.

Figure 3:
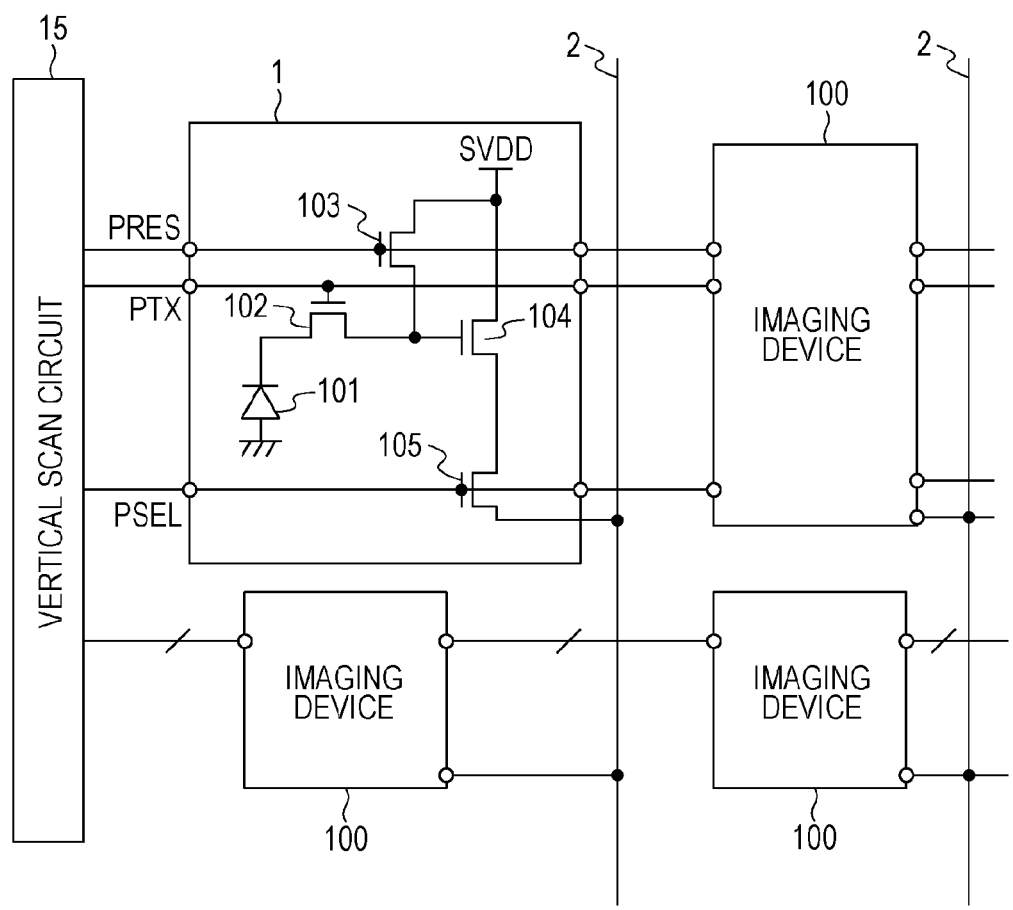
FIG. 3 illustrates an example of a configuration of a pixel.

FIG. 3 illustrates a configuration of the pixel 1 shown in FIG. 2. The pixel 1 includes a photoelectric converter 101, and MOS transistors 102, 103, 104, and 105. A control node of the MOS transistor 102 receives a signal PTX from the vertical scan circuit 15. If the vertical scan circuit 15 sets the signal PTX at High level (hereinafter, referred to as H level), the charge accumulated in the photoelectric converter 101 is transferred to an input node of the MOS transistor 104. One main node of the MOS transistor 104 receives a power supply voltage SVDD. The MOS transistor 104 outputs a signal based on the potential of the input node of the MOS transistor 104 to the MOS transistor 105. A control node of the MOS transistor 105 receives a signal PSEL from the vertical scan circuit 15. If the vertical scan circuit 15 sets the signal PSEL at H level, the signal output from the MOS transistor 104 is output to the vertical signal line 2. The MOS transistor 104 together with a current source (not shown) provided on the vertical signal line 2 may form a source follower circuit. A control node of the MOS transistor 103 receives a signal PRES from the vertical scan circuit 15. If the vertical scan circuit 15 sets the signal PRES at H level, the potential of the input node of the MOS transistor 104 is reset based on the potential of the power supply voltage SVDD. The MOS transistor 104 outputs a signal to the vertical signal line 2 through the MOS transistor 105 based on the reset potential of the input node of the MOS transistor 104. The signal indicates a signal a noise component of the pixel 1.

Figure 4A:
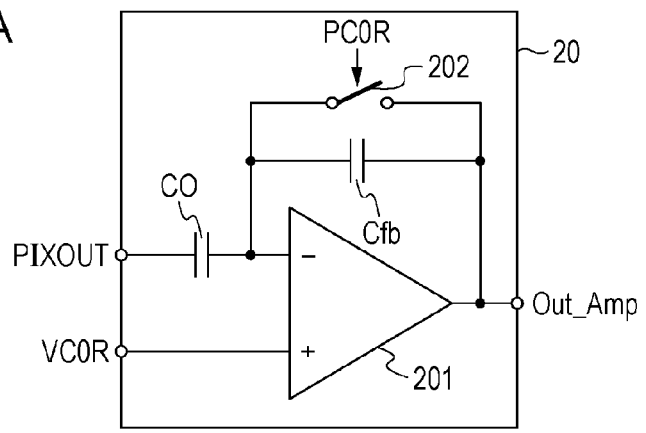
FIG. 4A illustrates an example of a configuration of an amplifier.

FIG. 4A illustrates the amplifier 20 shown in FIG. 2. The amplifier 20 includes a differential amplifier 201, capacitative elements C0 and Cfb, and a switch 202. An inverting input node of the differential amplifier 201 receives a pixel signal PIXOUT through the capacitative element C0. A non-inverting input node of the differential amplifier 201 receives a voltage VC0R. The capacitative element Cfb is provided in a feedback path between an output node and the inverting input node of the differential amplifier 201. If the TG 70 sets the signal PC0R at H level, the switch 202 becomes conductive, and the feedback path between the output node and the inverting input node of the differential amplifier 201 becomes conductive. Accordingly, the charge held in the capacitative element Cfb and the potential of the inverting input node of the differential amplifier 201 are reset. The differential amplifier 201 outputs a signal OUT_Amp based on the potential of the non-inverting input node.

Figure 4B:
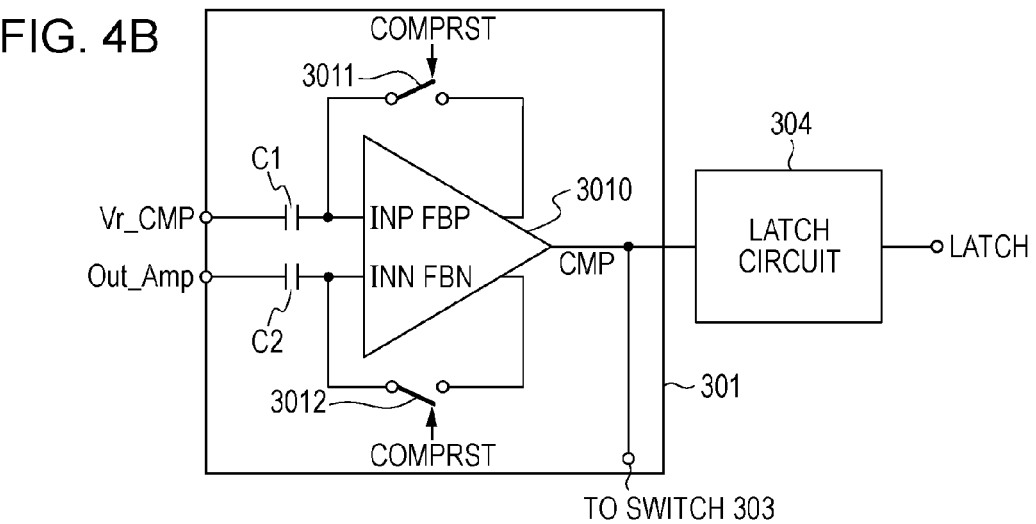
FIG. 4B illustrates an example of a configuration of a portion of a comparison unit.

FIG. 4B illustrates the comparison circuit 301 and the latch circuit 304 included in the comparison unit 30 shown in FIG. 2. The comparison circuit 301 includes a comparator 3010, capacitative elements C1 and C2, and switches 3011 and 3012. An input node INP of the comparator 3010 receives a reference signal Vr_CMP through the capacitative element C1. The reference signal Vr_CMP is one of the reference signals Vr1 and Vr2 selected by the selection circuit 302. An input node INN of the comparator 3010 receives a signal Out_Amp through the capacitative element C2. If the TG 70 sets the signal PC0R at High level (hereinafter, referred to as H level), the switches 3011 and 3012 become both conductive. If the switch 3011 becomes conductive, the potentials of an output node FBP and an input node INP of the comparator 3010 are reset. Also, if the switch 3012 becomes conductive, the potentials of an output node FBN and the input node INN of the comparator 3010 are reset.

Figure 4C:
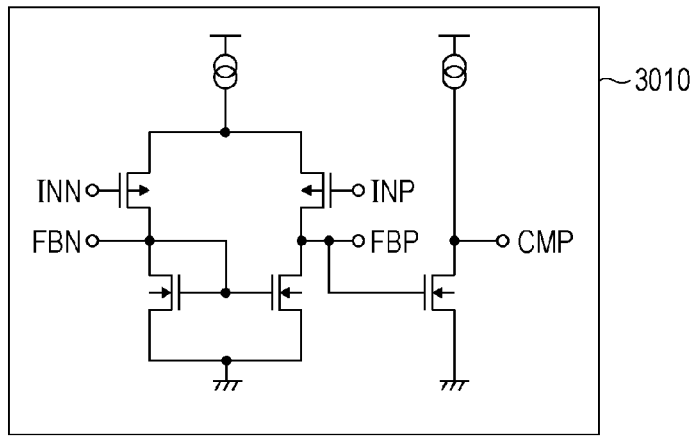
FIG. 4C illustrates an example of a configuration of a portion of the comparison unit.

FIG. 4C illustrates the comparator 3010. The input nodes INN and INP, and the output nodes FBN and FBP correspond to the respective nodes shown in FIG. 4B.

Figure 5:
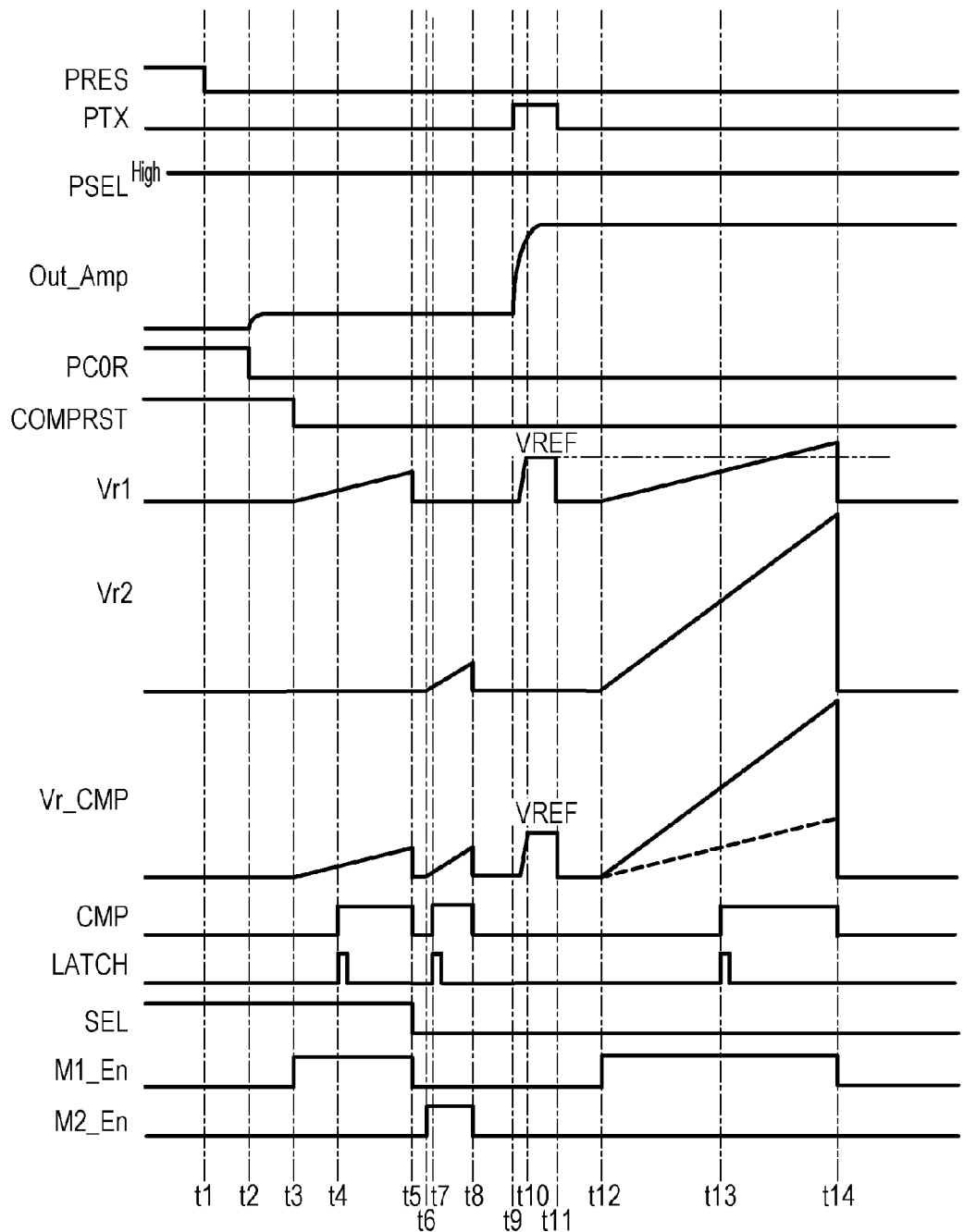
FIG. 5 is a timing chart of an example of an operation of the imaging device.

An operation of the imaging device shown in FIG. 2 is described below with reference to FIG. 5. Vr1 and Vr2 are reference signals output from the reference-signal supply unit 25. The reference signal Vr1 is a first reference signal having a potential that is changed by a first changing quantity per unit time. Also, the reference signal Vr2 is a second reference signal having a potential that is changed by a second changing quantity per unit time, the second changing quantity being larger than the first changing quantity. Vr_CMP is a reference signal, which is selected by the selection circuit 302 from among the reference signals Vr1 and Vr2 and output to the comparison circuit 301. CMP is a comparison result signal indicative of the result of comparison between the signal Out_Amp and the reference signal Vr_CMP by the comparison circuit 301. The first memory 502 holds the count signal if the signal M1_En is at H level and the signal value of the comparison result signal CMP is changed. The second memory 503 holds the count signal if the signal M2_En is at H level and the signal value of the comparison result signal CMP is changed.

At a time t1, the comparison result signal CMP, the latch signal LATCH, the signal M1_En, and the signal M2_En are at Low level (hereinafter, referred to as L level). The signal PSEL, the selection signal SEL, the signal PC0R, and the signal COMPRST are at H level. Meanwhile, the vertical scan circuit 15 changes the level of the signal PRES from H level to L level. Accordingly, a signal of a noise component is output from the pixel 1.

At a time t2, the TG 70 changes the level of the signal PC0R from H level to L level. Accordingly, the capacitative element C0 holds a charge based on the noise component output from the pixel 1. The amplifier 20 outputs the signal Out_Amp including an offset component of the differential amplifier 201.

At a time t3, the TG 70 sets the signal COMPRST at L level. The potential of the input node INN of the comparator 3010 at this time is a potential based on the reset potential. The capacitative element C1 holds a charge based on the potential of the reference signal Vr_CMP at the time t3. Also, the capacitative element C2 holds a charge based on the signal Out_Amp at the time t3. That is, the capacitative element C2 holds the charge based on the offset component of the differential amplifier 201. Then, the reference-signal supply unit 25 starts changing the potential of the reference signal Vr1 depending on time. Since the selection signal SEL is at H level, the selection circuit 302 outputs the reference signal Vr1 from among the reference signals Vr1 and Vr2 to the comparison circuit 301. Also, the selection circuit 302 sets the signal M1_En at H level.

At a time t4, the magnitude relationship between the signal output form the amplifier 20 and the reference signal Vr_CMP is reversed, and the signal value of the comparison result signal CMP is changed. Accordingly, the level of the latch signal LATCH is changed from L level to H level. The first memory 502 holds the count signal at this time in response to the change of the signal value of the latch signal LATCH from L level to H level. The digital signal held in the first memory 502 at this time is a first digital signal. Comparison between the potentials of the input node INN and the input node INP executed by the comparator 3010 when the first digital signal is generated is first comparison.

At a time t5, the reference-signal supply unit 25 stops the time-dependent change in potential of the reference signal Vr1, and sets the potential of the reference signal Vr1 at the potential at the time t3. Also, the selection circuit 302 sets the signal M1_En at L level. In a period from the time t5 to a time t6, the selection signal SEL is set at L level in response to an instruction signal (not shown) output from the TG 70 to the flag memory 501. Accordingly, the selection circuit 302 changes the reference signal, which is output to the comparison circuit 301, from the reference signal Vr1 to the reference signal Vr2.

At the time t6, the reference-signal supply unit 25 starts changing the potential of the reference signal Vr2 depending on time. The selection circuit 302 sets the signal M2_En at H level.

At a time t7, the magnitude relationship between the signal output form the amplifier 20 and the reference signal Vr_CMP is reversed, and the signal value of the comparison result signal CMP is changed. Accordingly, the level of the latch signal LATCH is changed from L level to H level. The second memory 503 holds the count signal at this time in response to the change of the signal value of the latch signal LATCH from L level to H level. The count signal held in the second memory 503 is a second digital signal. Comparison between the potentials of the input node INN and the input node INP executed by the comparator 3010 when the second digital signal is generated is second comparison.

The first digital signal and the second digital signal are digital signals based on the noise signal. The noise signal is a signal mainly indicative of the offset component of the comparator 3010 in the form shown in FIG. 5.

At a time t8, the reference-signal supply unit 25 stops the time-dependent change in potential of the reference signal Vr2, and sets the potential of the reference signal Vr2 at the potential at the time t3. The selection circuit 302 sets the signal M2_En at L level. TG 70 sets the selection signal SEL at L level. Accordingly, the selection circuit 302 changes the reference signal, which is output to the comparison circuit 301, from the reference signal Vr2 to the reference signal Vr1.

At a time t9, the vertical scan circuit 15 sets the signal PTX at H level. Accordingly, the pixel 1 outputs the photoelectric conversion signal to the vertical signal line 2. Since the capacitative element C0 holds the charge based on the noise component of the pixel 1, the photoelectric conversion signal, from which the noise component of the pixel is subtracted, is output to the differential amplifier 201. Accordingly, the amplifier 20 amplifies the photoelectric conversion signal, from which the noise component of the pixel is subtracted, and outputs the amplified signal as the signal Out_Amp to the comparison circuit 301. The capacitative element C2 holds the charge based on the offset component of the differential amplifier 201 at the time t3. Accordingly, the input node INN of the comparison circuit 301 receives the signal, which is obtained by subtracting the offset component of the differential amplifier 201 from the signal Out_Amp.

In a period from the time t8 to a time t10, the selection signal SEL is set at H level in response to an instruction signal (not shown) output from the TG 70, and hence the selection circuit 302 selects the reference signal Vr1 again.

At the time t10, the reference-signal supply unit 25 sets the potential of the reference signal Vr1 at a potential VREF. The potential VREF is nearly equal to the potential of the reference signal Vr1 at a time t14 (described later). It is prefer that the potential VREF is smaller than the potential of the reference signal Vr1 at a time t14. If the signal output from the amplifier 20 is larger than the potential VREF, the comparison circuit 301 outputs the comparison result signal at L level. In contrast, if the signal output from the amplifier 20 is smaller than the potential VREF, the comparison circuit 301 outputs the comparison result signal at H level. In this case, the description is given based on an assumption that the comparison result signal CMP output from the comparison circuit 301 is at L level.

In a period from the time t10 to a time t11, the flag memory 501 holds L level of the comparison result signal CMP.

At the time t11, the reference-signal supply unit 25 causes the potential of the reference signal Vr1 to be equal to the potential at the time t3.

In a period from the time t11 to a time t12, the signal level held in the flag memory 501 is reflected on the selection signal SEL. Since the comparison result signal CMP is at L level, the level of the selection signal SEL is changed to L level, and the selection circuit 302 selects the reference signal Vr2. If the comparison result signal is at H level, the level of the selection signal SEL is held at H level, and the selection circuit 302 continuously selects the reference signal Vr1.

At the time t12, the reference-signal supply unit 25 starts changing the potentials of the reference signals Vr1 and Vr2 depending on time. That is, the reference-signal supply unit 25 outputs the reference signals Vr1 and Vr2 having potentials that are changed depending on time, to the selection circuit 302 in parallel. The selection circuit 302 outputs the reference signal Vr2 to the comparison circuit 301 based on the selection signal SEL at L level. The selection circuit 302 sets the signal M1_En at H level. Accordingly, preparation for rewriting the signal of the first memory 502, which holds the count signal at the time t4, is completed. If the comparison result signal, which is output from the comparison circuit 301 at the time t10, is at H level, the selection circuit 302 sets the signal M2_En at H level. In this case, preparation for rewriting the signal of the second memory 503 is completed.

At a time t13, the magnitude relationship between the signal output form the amplifier 20 and the reference signal Vr_CMP is reversed, and the signal value of the comparison result signal CMP is changed. The first memory 502 holds the count signal at this time. The count signal held in the first memory 502 at this time is a third digital signal based on the photoelectric conversion signal. Comparison between the potentials of the input node INN and the input node INP executed by the comparator 3010 when the third digital signal is generated is third comparison.

At the time t14, the reference-signal supply unit 25 stops the time-dependent change in potential of the reference signals Vr1 and Vr2, and sets the potential of the reference signal Vr1 at the potential at the time t3. The selection circuit 302 sets the signal M1_En at L level.

After the time t14, the horizontal scan circuit 60 successively scans the memory unit 50, and causes the flag memory 501, the first memory 502, and the second memory 503 of each column to output digital signals held in the respective memories to the DSP 90. In the form described in this embodiment, the signal output from the flag memory 501 is a signal based on the comparison result signal at L level, and the signal output from the first memory 502 is a digital signal based on the photoelectric conversion signal and generated by using the reference signal Vr2. The signal output from the second memory 503 is a digital signal based on the noise signal and generated by using the reference signal Vr2. The digital signal based on the photoelectric conversion signal includes a component of a digital signal based on the noise signal. Accordingly, since the DSP 90 subtracts the digital signal based on the noise signal from the digital signal based on the photoelectric conversion signal, influence of a variation in characteristic of each column of the comparison unit 30 can be decreased. That is, the DSP 90 generates a digital signal with a less noise signal. This digital signal is referred to as digital S signal. The DSP 90 executes processing of multiplying the digital S signal by a gain based on the ratio of gradients of the reference signals Vr1 and Vr2 for the column in which AD conversion is executed on the photoelectric conversion signal by using the reference signal Vr2. For example, if the gradient of the reference signal Vr2 is quadruple of the gradient of the reference signal Vr1, the DSP 90 quadruples the signal value of the digital S signal for the column in which AD conversion is executed on the photoelectric conversion signal by using the reference signal Vr2. The signal processing of quadrupling the signal value may be executed such that a signal of each bit of the digital S signal is shifted by two bits each to the higher-order side.

Also, in the imaging device described in Japanese Patent Laid-Open No. 2007-281987, the two comparison units are provided in the AD converter of each column. In the imaging device of this embodiment, the single comparison unit may be provided in the AD converter of each column. Accordingly, the imaging device of this embodiment can obtain a digital signal with a less noise component while decreasing an increase in circuit scale of the AD converter.

In the form described in this embodiment, as the memory that holds the count signal, the two memories of the first memory 502 and the second memory 503 are provided for each column. However, the imaging device of this embodiment is not limited to the form, and three memories, each of which holds a count signal, may be provided for each column. Two of three memories respectively hold a digital signal based on a noise signal generated by using the reference signal Vr1, and a digital signal based on a noise signal generated by using the reference signal Vr2. Then, the other memory holds a digital signal based on the photoelectric conversion signal generated by using the reference signal Vr1 or the reference signal Vr2. Even with this form, similarly to the imaging device of this embodiment, a digital signal with a less noise component can be obtained. In contrast, with the imaging device of this embodiment shown in FIG. 2, since the number of memories can be reduced as compared with the form in which the three memories each holding the count signal are provided for each column, the imaging device of this embodiment has an advantage of decreasing an increase in circuit scale of the AD converter.

Alternatively, the imaging device of this embodiment may include two memories for each column. Each of the memories holds the digital signal based on the photoelectric conversion signal. One of the two memories holds the digital signal based on the photoelectric conversion signal generated by using the reference signal Vr1, and the other holds the digital signal based on the photoelectric conversion signal generated by using the reference signal Vr2. Even with this form, similarly to the imaging device of this embodiment, a digital signal with a less noise component can be obtained. In this form, AD conversion for a single photoelectric conversion signal is executed by using both the reference signal Vr1 and the reference signal Vr2. In contrast, with the imaging device of this embodiment shown in FIG. 2, the single memory, which holds the digital signal based on the photoelectric conversion signal may be provided for each column. Accordingly, the imaging device shown in FIG. 2 has an advantage of decreasing an increase in circuit scale of the AD converter, as compared with the form in which the two memories, which hold the digital signals based on the photoelectric conversion signal, are provided for each column. Also, in the form, in which the two memories which hold the digital signals based on the photoelectric conversion signal are provided for each column, AD conversion for the photoelectric conversion signal is executed by using both the reference signal Vr1 and the reference signal Vr2. Owing to this, with the form in which the two memories which hold the digital signals based on the photoelectric conversion signal are provided for each column, the AD conversion period for the photoelectric conversion signal is provided for two times of the period from the time t12 to the time t14 in FIG. 5. In contrast, with the imaging device shown in FIGS. 2 and 5, the AD conversion period of the photoelectric conversion signal may be the period from the time t12 to the time t14. Accordingly, the imaging device shown in FIGS. 2 to 5 has an advantage of decreasing the AD conversion period for the photoelectric conversion signal, as compared with the form in which the two memories which hold the digital signals based on the photoelectric conversion signal are provided for each column.

The time-dependent change in potential of the reference signals Vr1 and Vr2 of this embodiment is started from the potentials of the reference signals Vr1 and Vr2 at the time when the level of the signal COMPRST is changed from H level to L level. This embodiment is not limited to this form. For example, the potentials of the reference signals Vr1 and Vr2 are changed from the potentials of the reference signals Vr1 and Vr2 at the time when the level of the signal COMPRST is changed from H level to L level, in a direction opposite to a direction in which the potentials are changed depending on time. Then, the potentials of the reference signals Vr1 and Vr2 may be changed depending on time.

The noise signal in this embodiment is a signal mainly including an offset component of the comparator 3010. This embodiment is not limited to this form. For example, the capacitative element C2 may not be provided, and the offset component of the differential amplifier 201 may be given from the amplifier 20 to the input node INN of the comparator 3010. The noise signal in this case is a signal mainly including an offset component of the comparison circuit 301 and an offset component of the differential amplifier 201. Further, if the capacitative element C0 is not provided and a noise component of the pixel 1 is given to the inverting input node of the differential amplifier 201, the noise signal is a signal mainly including a noise component of the pixel 1, an offset component of the differential amplifier 201, and an offset component of the comparison circuit 301.

Also, in this embodiment, the amplifier 20 is provided in the electrical path between the pixel 1 and the comparison unit 30. Alternatively, the amplifier 20 may not be provided, and the pixel signal PIXOUT of the pixel 1 may be output to the comparison unit 30. In this form, the analog-signal output unit 150 is the pixel 1. In this form, if the capacitative element that holds the noise component of the pixel 1 is not provided between the pixel 1 and the comparison unit 30, the noise signal is a signal mainly including the noise component of the pixel 1 and the offset component of the comparison circuit 301.

That is, in this embodiment, the noise signal may be applied in any case when the main component of the noise signal is the noise component of the pixel, is the offset component of the amplifier 20, and is the offset component of the comparison circuit 301.

Second Embodiment

An imaging device according to this embodiment is described below with reference to the drawings, mainly for a point different from the first embodiment.

Figure 6A:
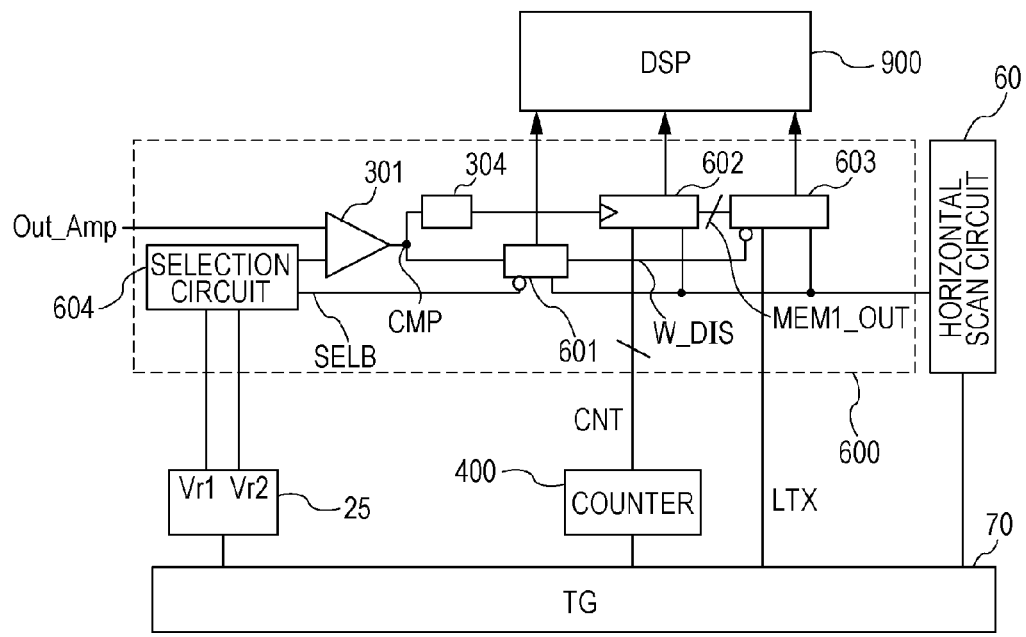
FIG. 6A illustrates a configuration of a portion of the imaging device.

FIG. 6A illustrates a configuration of a portion of the imaging device according to this embodiment. In FIG. 6A, the same reference signs as those in FIG. 2 are applied to elements having the same functions as those in FIG. 2. The imaging device according to this embodiment includes an AD converter 600 for each column, instead of the AD converter 110 in the first embodiment. Also, the imaging device of this embodiment includes a DSP 900.

In this embodiment, the changing quantity of the potential per unit time of the reference signal Vr2 is quadruple of the changing quantity of the potential per unit time of the reference signal Vr1. The number of bits of a digital signal based on the photoelectric conversion signal is N bits and generated by the AD converter in this embodiment. Also, the number of bits of a digital signal based on the noise signal is M bits and generated by the AD converter. The relationship of the numbers of bits between N bits and M bits is N≥M+2.

The AD converter 600 includes the comparison circuit 301, the latch circuit 304, a counter 400, a flag memory 601, a first memory 602, a second memory 603, and a selection circuit 604. The flag memory 601 outputs a write-control signal W_DIS based on the comparison result signal CMP to the second memory 603. Also, the flag memory 601 outputs a selection signal SELB, which is a signal inverted from a held signal, to the selection circuit 604. The first memory 602 outputs a digital signal MEM1_OUT, which is held in the first memory 602, to the second memory 603. In this embodiment, if the selection signal SELB is at L level, the selection circuit 604 outputs the reference signal Vr1 to the comparison circuit 301. Also, if the selection signal SELB is at H level, the selection circuit 604 outputs the reference signal Vr2 to the comparison circuit 301. The TG 70 outputs a transfer-control signal LTX to the second memory 603.

The DSP 900 processes the digital signals output from the flag memory 601, the first memory 602, and the second memory 603 of the AD converter 600 of each column, and outputs the processed signals to the outside of the imaging device.

Figure 6B:
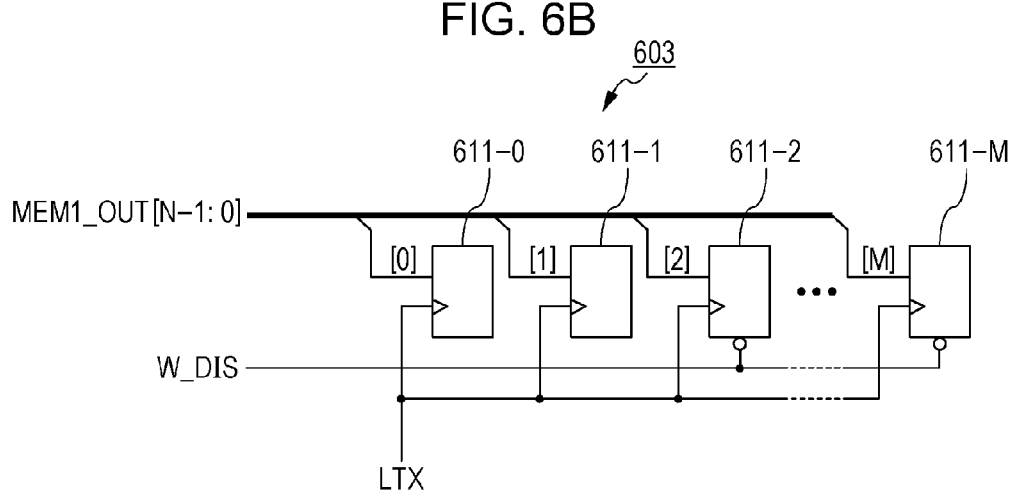
FIG. 6B illustrates a configuration of a second memory.

FIG. 6B illustrates a configuration of the second memory 603. The second memory 603 includes memory circuits 611-0 to 611-(M−1) for M bits. The number in brackets [ ] in FIG. 6B represents a bus. For example, [0] represents a bus through which a signal of the least significant bit (LSB) is transmitted. The number increases from the lower-order bit, such as [0], [1], and [2], and buses up to [M−1], which is the most significant bit (MSB) are provided in this embodiment. Hereinafter, a digital signal from a lower-order A bit to an higher-order B bit is expressed as [B:A]. If the transfer-control signal LTX is at H level, the memory circuit 611-0 and the memory circuit 611-1 hold an output digital signal MEM1_OUT[1:0] output from the first memory 602. If the transfer-control signal LTX is at H level and the write-control signal W_DIS is at L level, other memory circuits 611-2 to 611-(M−1) hold a digital signal MEM1_OUT[M−1:2] output from the first memory 602. In this embodiment, it is assumed that writing is allowed if the write-control signal W_DIS is at L level.

Figure 7A:
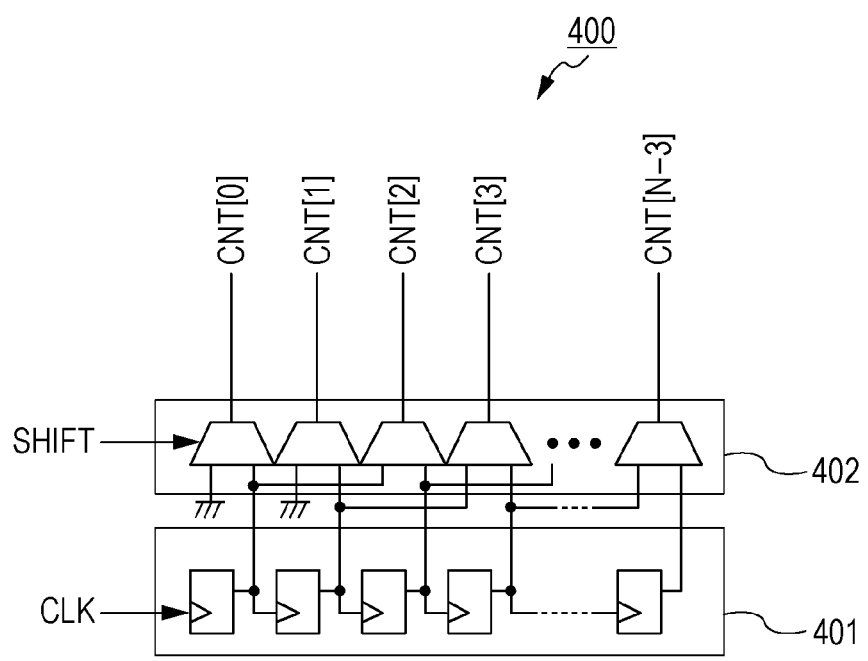
FIG. 7A illustrates a configuration of a counter.

FIG. 7A illustrates a configuration of the counter 400. A count-signal generation unit 401 has T-FF circuits by a number N. The count-signal generation unit 401 counts the clock signal CLK, generates a count basic signal, and outputs the count basic signal to a selector group 402. The clock signal CLK is input from the TG 70 to T-FF circuits that output LSB values of the count basic signal. The selector group 402 has selectors by a number M. FIG. 7A illustrates a case of M=N−2. If a shift signal SHIFT input from the TG 70 is at H level, the selector group 402 outputs the count signal CNT in which each bit signal of the count basic signal is shifted to the higher-order side by two bits each. Meanwhile, if the shift signal SHIFT input from the TG 70 is at L level, the selector group 402 outputs the count basic signal as the count signal CNT.

Figure 7B:
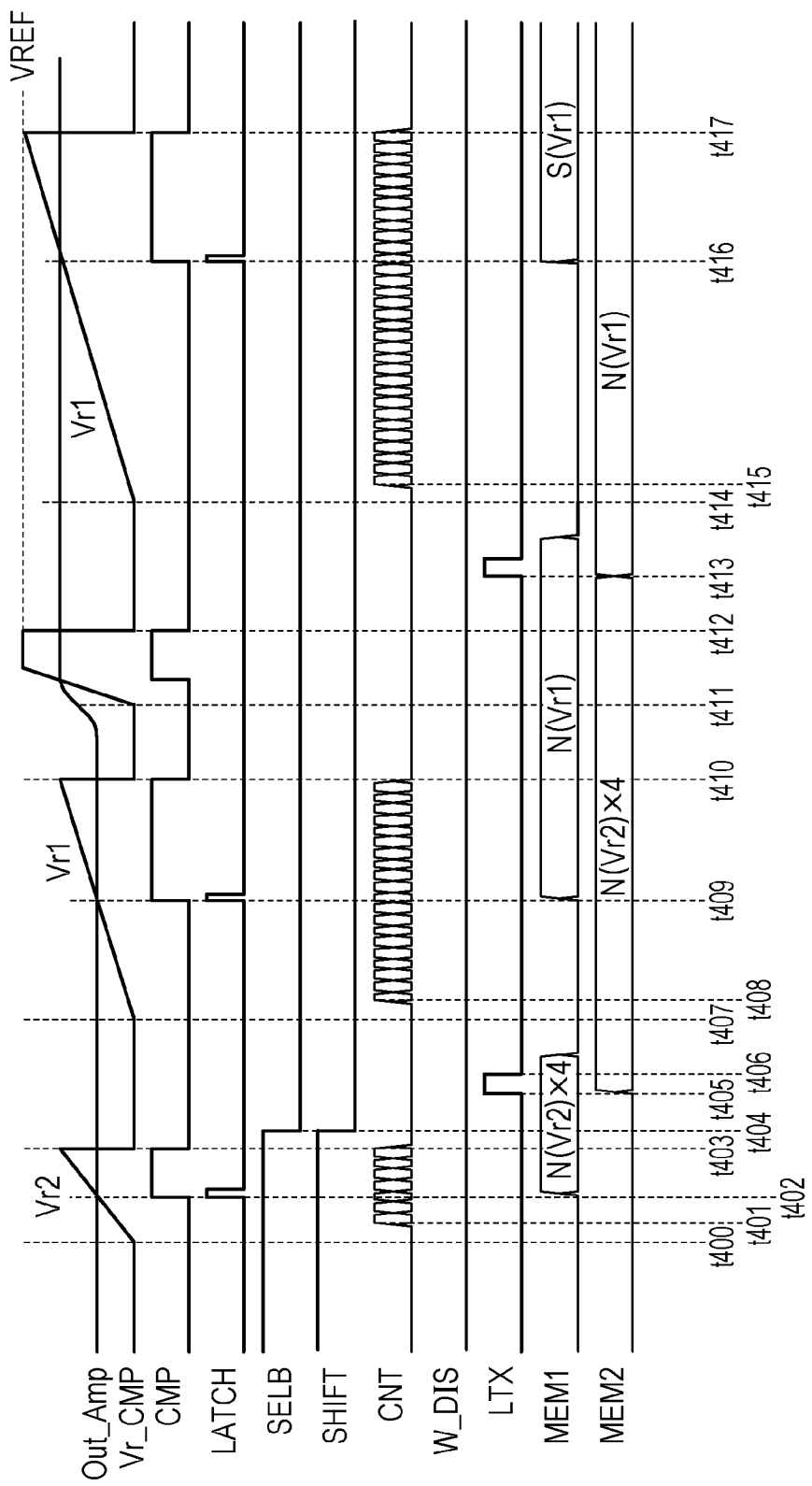
FIG. 7B illustrates an operation of the imaging device.

Next, an operation of the AD converter 600 in the imaging device according to this embodiment is described with reference to a timing chart in FIG. 7B. The timing chart in FIG. 7B shows a state from the timing at the time t3 and later in FIG. 5. That is, it is assumed that a signal based on the noise signal is output as the signal Out_Amp of the amplifier 20 in this state. Also, in FIG. 7B, a column with a smaller output signal of the amplifier 20 based on the photoelectric conversion signal than the potential VREF is described.

At a time t400, the comparison result signal CMP, the latch signal LATCH, the write-control signal W_DIS, and the transfer-control signal LTX are at L level. The flag memory 601 sets the selection signal SELB at H level. Accordingly, the selection circuit 604 outputs the reference signal Vr2 as the reference signal Vr_CMP to the comparison circuit 301. Also, the shift signal SHIFT is at H level. Then, a time-dependent change in potential of the reference signal Vr2 is started. At a time t401, the counter 400 starts counting. The shift signal SHIFT is at H level. Accordingly, the counter 400 outputs the count signal CNT, which is shifted to the higher-order side by two bits each from the count signal obtained by counting the clock signal, to the AD converter 600. Herein, it is assumed that the interval between the time t400 and the time t401 is the same as L0 in FIG. 1A. The interval of the difference between the timing of the start of the change in potential of the reference signal and the timing of the start of the counting operation, described later, is also the same as L0 in FIG. 1A.

At a time t402, the magnitude relationship between the signal Out_Amp of the amplifier 20 and the reference signal Vr_CMP is reversed, and the level of the comparison result signal CMP is changed to H level. With this change, the level of the latch signal LATCH is changed from L level to H level for a predetermined period, and the first memory 602 holds the count signal CNT at a timing when the level is lowered. It is assumed that the digital signal held at this time is N(Vr2)×4. Since this data is shifted by two bits, lower-order two bits hold "zero (0)."

At a time t403, the reference-signal supply unit 25 stops the change in potential of the reference signal Vr2, and returns the potential of the reference signal Vr2 to the potential at the time t400. Accordingly, the level of the comparison result signal CMP is changed to L level. Also, the counter 400 stops the counting operation. At a time t404, the flag memory 601 sets the selection signal SELB at L level. Accordingly, the selection circuit 604 outputs the reference signal Vr1 to the comparison circuit 301. It is to be noted that the timing at which the level of the selection signal SELB is changed to L level does not have to be the time t404, and may be between the time t403 and a time t407 (described later). Also, reset of the count signal CNT and change of the level of the shift signal SHIFT to L level may be executed in a period from the time t403 to a time t408.

The TG 70 sets the transfer-control signal LTX at H level in a period from a time t405 to a time t406. At the same time, the write-control signal W_DIS is held at L level. Accordingly, the first memory 602 outputs the digital signal N(Vr2)×4 as the output digital signal MEM1_OUT to the second memory 603. The second memory 603 holds this digital signal N(Vr2)×4.

At the time t407, the reference-signal supply unit 25 starts changing the potential of the reference signal Vr1 depending on time. Also, the counter 400 starts the counting operation at the time t408. At the same time, the shift signal SHIFT is at L level. Accordingly, the counter 400 outputs this count signal as the count signal CNT without executing bit shift on the count signal obtained by counting the clock signal.

At a time t409, the magnitude relationship between the signal Out_Amp of the amplifier 20 and the reference signal Vr_CMP is reversed, and the signal value of the comparison result signal CMP is changed to H level. With this change, the level of the latch signal LATCH is changed from L level to H level for a predetermined period, and the first memory 602 holds the count signal CNT at a timing when the level is lowered. The digital signal held at this time is N(Vr1).

At a time t410, the reference-signal supply unit 25 stops the change in potential of the reference signal Vr1, and returns the potential of the reference signal Vr1 to the potential at the time t408. Also, the counter 400 stops the counting operation, and the count signal CNT is reset at a certain timing before a time t415 (described later).

The signal based on the photoelectric conversion signal is output from the amplifier 20 in a period from the time t410 to a time t411, and the potential of the signal Out_Amp is changed. At the time t411, the reference-signal supply unit 25 changes the potential of the reference signal Vr1 to the potential VREF. In FIG. 7B, since the signal Out_Amp of the amplifier 20 is smaller than the potential VREF, the comparison result signal CMP is at H level, and the result is held in the flag memory 601. The selection signal SELB is an inversion signal of the signal held in the flag memory 601. Hence, the signal level of the selection signal SELB is held at L level, and the selection circuit 604 continuously selects the reference signal Vr1. At a time t412, the potential of the reference signal Vr1 is returned to the potential at the time t411.

In a predetermined period from a time t413, the TG 70 sets the transfer-control signal LTX at H level. At the same time, the write-control signal W_DIS is at L level. Accordingly, the digital signal N(Vr2)×4 held in the second memory 603 is rewritten by a digital signal N(Vr1) output from the first memory 602.

At a time t414, the time-dependent change in potential of the reference signals Vr1 and Vr2 is started. At the same time, since the selection signal SELB is at L level, the reference signal Vr1 is input as the reference signal Vr_CMP by the selection circuit 604 to the comparison circuit 301. At the time t415, the counter 400 starts the counting operation. At the same time, since the shift signal SHIFT is at L level, the count signal CNT without bit shift is output.

At a time t416, the magnitude relationship between the signal Out_Amp of the amplifier 20 and the reference signal Vr_CMP is reversed, and the signal value of the comparison result signal CMP is changed to H level. With this change, the level of the latch signal LATCH is changed from L level to H level for a predetermined period, and the first memory 602 holds the count signal CNT at a timing when the level is lowered. It is assumed that the digital signal held at this time is S(Vr1).

At a time t417, the change in potential of the reference signals Vr1 and Vr2 is stopped, and the potentials are returned to the respective potentials at the time t414. Also, the counter 400 stops the operation.

Figure 8:
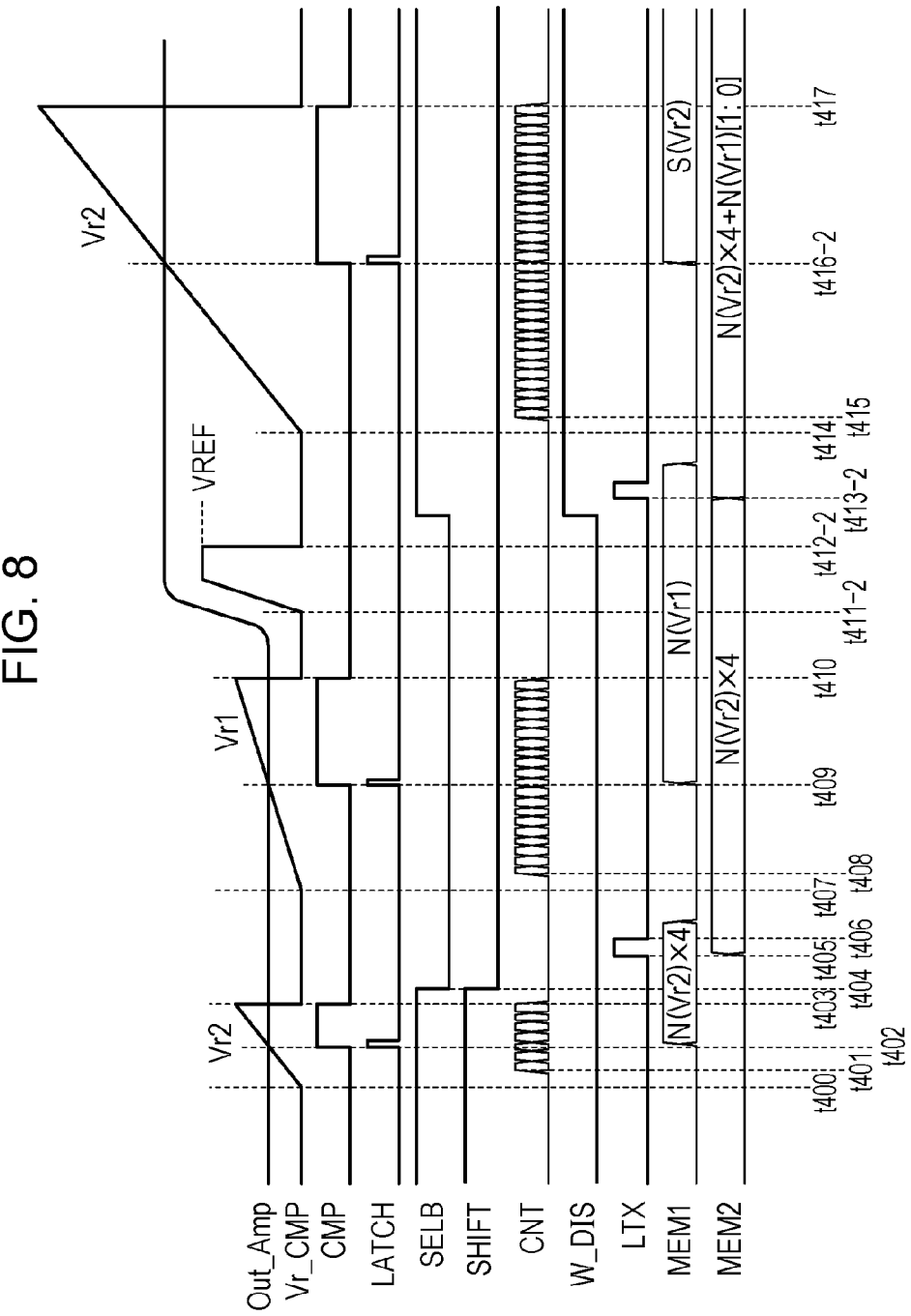
FIG. 8 illustrates an operation of the imaging device.

Next, a column in which the output signal of the amplifier 20 based on the photoelectric conversion signal is larger than the potential VREF is described with reference to a timing chart in FIG. 8. The operation before a time t411-2 is the same as the operation in FIG. 7B, and hence the description is omitted.

In a period from the time t411-2 to a time t412-2, since the amplitude of the signal Out_Amp of the amplifier 20 is larger than the potential VREF, the comparison result signal CMP outputs L level, and the result is held in the flag memory 601. In response to a control signal (not shown), H level, which is an inversion signal of the signal held in the flag memory 601, is output as the selection signal SELB, and the reference signal Vr2 is selected. The timing at which the selection signal SELB is inverted may be in a period from the time t412-2 to the time t414. Also, based on the result held in the flag memory 601 in the period from the time t412-2 to the time t413-2, the level of the write-control signal W_DIS is changed to H level.

In a predetermined period from the time t413-2, the TG 70 sets the transfer-control signal LTX at H level. At the same time, since the write-control signal W_DIS is at H level, writing by lower-order two bits is allowed for the memory circuit 611-0 and the memory circuit 611-1. Accordingly, the digital signal N(Vr1)[1:0], which is the lower-order two bits of the digital signal N(Vr1) is rewritten by the second memory 603. Hence, a digital signal N(Vr2)×4+N(Vr1)[1:0] is held in the second memory 603.

At the time t414, the time-dependent change in potential of the reference signal Vr1 and the reference signal Vr2 is started. At the same time, since the selection signal SELB is at H level, the reference signal Vr2 is input as the reference signal Vr_CMP by the selection circuit 604 to the comparison circuit 301. At the time t415, the counting operation is started. At a time t416-2, the first memory 602 holds the count signal CNT at a timing when the level of the latch signal LATCH is lowered. At the same time, the digital signal held in the first memory 602 is referred to as S(Vr2).

As described above, in accordance with the magnitude relationship between the signal Out_Amp of the amplifier 20 based on the photoelectric conversion signal and the potential VREF, the following signals are held in the corresponding memories.

(AD converter 110 of Out_Amp<VREF)
Flag memory 601 . . . H level
First memory 602 . . . S(Vr1)
Second memory 603 . . . N(Vr1)
(AD converter 110 of Out_Amp>VREF)
Flag memory 601 . . . L level
First memory 602 . . . S(Vr2)
Second memory 603 . . . N(Vr2)×4+N(Vr1)[1:0]

These digital signals are successively output to the DSP 900 at the time t417 and later in accordance with scanning of the horizontal scan circuit 60. The digital signal based on the photoelectric conversion signal is continuously output from the first memory 602 regardless of the signal level of the flag memory 601. Also, the digital signal based on the noise signal is output from the second memory 603.

In this embodiment, AD conversion is executed with the reference signal Vr1 after AD conversion with the reference signal Vr2. However, AD conversion may be executed with the reference signal Vr2 after AD conversion with the reference signal Vr1. In this case, the first memory 602 outputs the digital signal N(Vr1), which is obtained by using the reference signal Vr1, as the output digital signal MEM1_OUT to the second memory 603. Accordingly, the second memory 603 holds the digital signal N(Vr1). Then, the first memory 602 holds the digital signal N(Vr2)×4 obtained by using the reference signal Vr2.

Signal processing at the DSP 900 is described. For a column in which the signal level of the flag memory 601 is H level, the digital S signal is obtained by subtracting the digital signal N(Vr1) held in the second memory 603 from the digital signal S(Vr1) held in the first memory 602. Also, for a column in which the signal level of the flag memory 601 is L level, the digital signal S(Vr2) held in the first memory 602 is multiplied by a quadruple gain. Then, the digital S signal is obtained by subtracting the digital signal N(Vr2)×4+N(Vr1) [1:0] held in the second memory 603.

In the imaging device according to the above-described first embodiment, if the two memories are provided for each column, the memory in which the digital signal based on the noise signal is stored and the memory in which the digital signal based on the photoelectric conversion signal is stored are switched in accordance with the magnitude of the photoelectric conversion signal. To be specific, if the output signal of the amplifier 20 is smaller than the potential VREF, the digital signal based on the noise signal is stored in the second memory 503. Also, the digital signal based on the photoelectric conversion signal is stored in the first memory 502. In contrast, if the output signal of the amplifier 20 is larger than the potential VREF, the digital signal based on the noise signal is stored in the first memory 502. Also, the digital signal based on the photoelectric conversion signal is stored in the second memory 503. Hence, when the following-stage DSP 90 executes differential processing, the polarity of the differential processing had to be changed based on the comparison result signal output from the flag memory 501. However, with the above-described configuration and driving of the AD converter 600 of this embodiment, the differential processing with the same polarity can be continuously executed regardless of the value output from the flag memory 601.

Also, in the imaging device according to the first embodiment, for example, if the gradient ratio of the reference signal Vr1 and the reference signal Vr2 is quadruple, two-bit shift is required for a column in which AD conversion is executed on the photoelectric conversion signal by using the reference signal Vr2. However, if the digital signal is shifted by two bits to the higher-order side, the digital signal becomes a signal with all lower-order two bits being "zero (0)." Hence, when acquired image data is multiplied by a digital gain for enhanced display, unnatural display may be obtained because of insufficient resolution of lower-order bits. However, as described above, in this embodiment, since a signal, which is not related to the lower-order two bits of the digital signal based on the noise signal of the column converted by using the reference signal Vr2, is held, a debasement of the image quality due to insufficient gradation can be suppressed.

In this embodiment, the changing quantity of the potential per unit time of the reference signal Vr2 is quadruple of the changing quantity of the potential per unit time of the reference signal Vr1. For another example, the reference-signal supply unit 25 may set the changing quantity of the potential per unit time of the reference signal Vr2 to be the n-th power (n is an integer of 1 or lager) of 2 of the reference signal Vr1. In this case, the counter 400 outputs the count signal CNT, in which each count basic signal is shifted by higher-order n bits each. Accordingly, the second memory 603 holds the digital signal, in which each bit signal of the digital signal based on the noise signal converted by using the reference signal Vr2 is shifted by higher-order n bits each. Then, to increase resolution of lower-order bits, the lower-order n bits of the signal held in the second memory 603 may hold the digital signal based on the noise signal converted by using the reference signal Vr1.

Third Embodiment

An imaging device according to this embodiment is described below with reference to the drawings, mainly for a point different from the first embodiment.

In the imaging device according to this embodiment, in addition to the advantage obtained by the imaging device according to the first embodiment, an error of a digital signal generated because the ratio of changing quantities of potentials per unit time among a plurality of reference signals varies can be decreased.

Figure 9A:
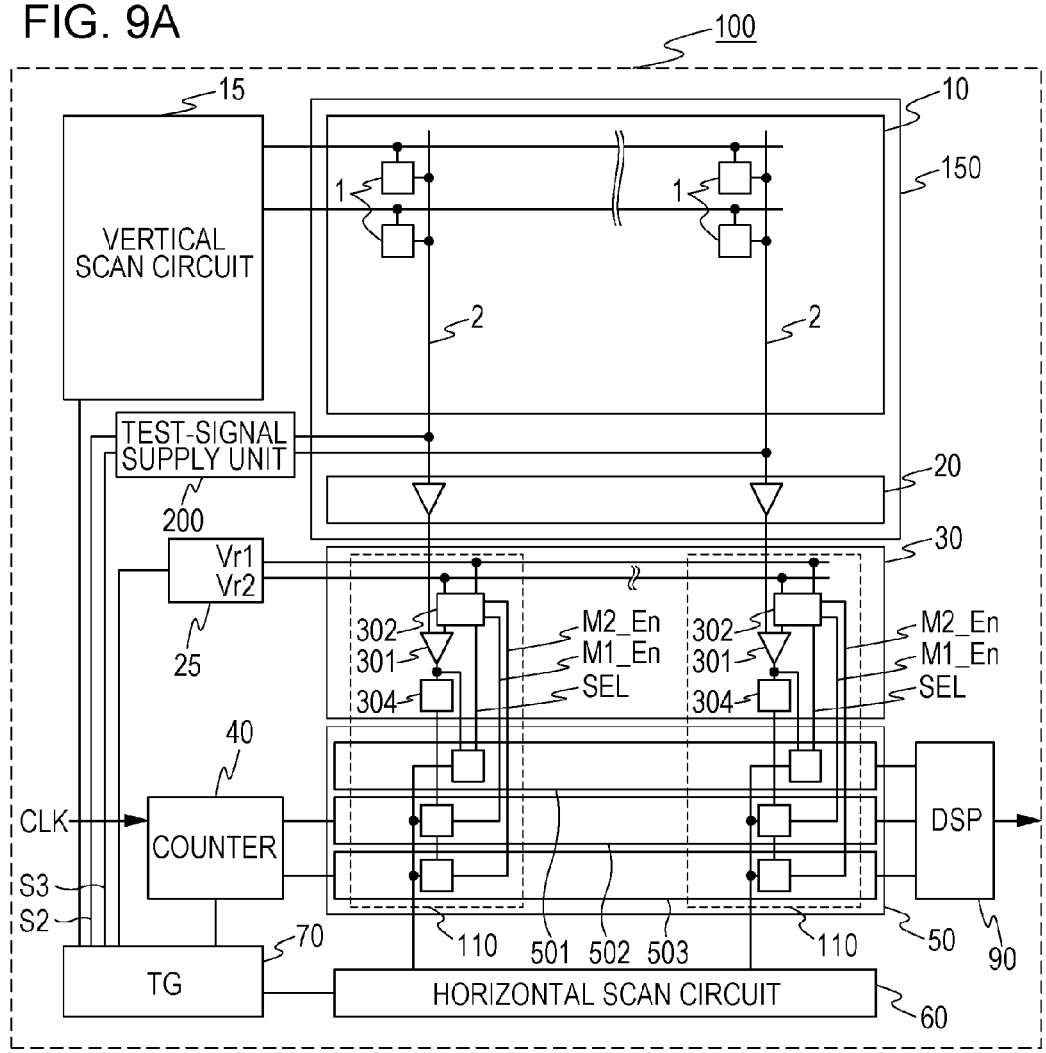
FIGS. 9A and 9B illustrate other example of the imaging device and an example of a test-signal supply unit.

FIG. 9A is a schematic illustration of the imaging device according to this embodiment. The imaging device according to this embodiment includes a test-signal supply unit 200 in addition to the configuration of the first embodiment. The same signs as those in FIG. 2 are applied to elements in FIG. 9A having the same functions as those in the imaging device shown in FIG. 2. The imaging device according to this embodiment includes the test-signal supply unit 200 electrically connected to the vertical signal line 2. Signals S2 and S3 are output form the TG 70 to the test-signal supply unit 200.

Figure 9B:
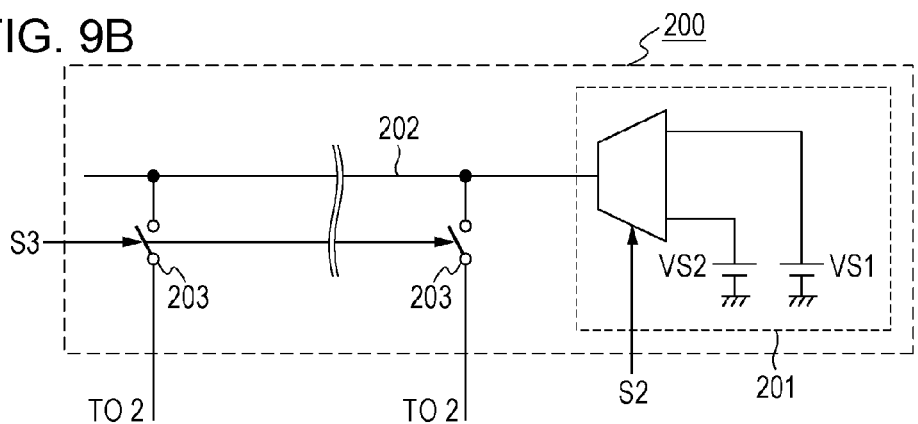

FIG. 9B illustrates a configuration of the test-signal supply unit 200. The test-signal supply unit 200 includes a test signal selection unit 210, a test-signal supply line 220, and a switch 203. The test signal selection unit 210 outputs one of test signals VS1 and VS2 having different signal values to the test-signal supply line 220 in response to the signal S2. The test signal VS1 in this embodiment is a signal value of the noise signal of the pixel 1 according to the first embodiment. Also, the test signal VS2 in this embodiment has a signal value that is equal to or smaller than the potential of the reference signal Vr1 at a time t48 (described later). The test-signal supply line 220 is electrically connected to the vertical signal line 2 of each column through the switch 203. The switch 203 becomes conductive if the signal S3 is at H level.

A correction operation of the imaging device according to this embodiment is described with reference to FIG. 10A.

At a time t40, the signal S3 is at H level, and the signal of the test-signal supply line 220 is output to the vertical signal line 2 of each column. The selection signal SEL is at H level.

At a time t41, the signal S2 is set at H level. Accordingly, the test signal VS1 is output to the vertical signal line 2 of each column.

At a time t42-1, the reference-signal supply unit 25 starts changing the potential of the reference signal Vr1 depending on time. The selection circuit 302 sets the signal M2_En at H level. Then, at a time t42-2, the counter 40 starts the counting operation of the clock signal.

At a time t43, the magnitude relationship between the test signal VS1 and the potential of the reference signal Vr1 is reversed, and the signal value of the latch signal LATCH is changed. The second memory 503 holds the count signal at this time. The count signal held in the second memory 503 is expressed as digital signal DN1 in this embodiment. The digital signal DN1 is a fourth digital signal based on the test signal VS1 of the first analog signal.

At a time t44, the reference-signal supply unit 25 stops changing the potential of the reference signal Vr1.

At a time t45, the TG 70 sets the signal S2 at L level. Accordingly, the test signal VS2 is output to the vertical signal line 2 of each column through the test-signal supply line 220 and the switch 203.

At a time t46-1, the reference-signal supply unit 25 starts changing the potential of the reference signal Vr1 depending on time. Also, the selection circuit 302 sets the signal M1_En at H level. Then, at a time t46-2, the counter 40 starts the counting operation of the clock signal.

At a time t47, the magnitude relationship between the test signal VS2 and the reference signal Vr1 is reversed, and the signal value of the latch signal LATCH is changed. The first memory 502 holds the count signal at this time. The count signal held in the first memory 502 is expressed as digital signal DS1 in this embodiment. The digital signal DS1 is a sixth digital signal based on the test signal VS1 of the first analog signal. It is to be noted that a fifth digital signal is a digital signal DN2 (described later).

At a time t48, the reference-signal supply unit 25 stops changing the potential of the reference signal Vr1 depending on time. In a period from the time t48 to a time t50-1, the horizontal scan circuit 60 successively transfers signals held in the first memory 502 and the second memory 503 of each column to the DSP 90.

At a time t49, the TG 70 sets the signal S2 at H level. Accordingly, the test signal VS1 is output to the vertical signal line 2 of each column through the test-signal supply line 220 and the switch 203. Also, the TG 70 sets the selection signal SEL at L level.

At the time t50-1, the reference-signal supply unit 25 starts changing the potential of the reference signal Vr2 depending on time. Also, the selection circuit 302 sets the signal M2_En at H level. Then, at a time t50-2, the counter 40 starts the counting operation of the clock signal.

At a time t51, the magnitude relationship between the test signal VS1 and the reference signal Vr2 is reversed, and the signal value of the latch signal LATCH is changed. The second memory 503 holds the count signal at this time. The count signal held in the second memory 503 is expressed as digital signal DN2 in this embodiment. The digital signal DN2 is a fifth digital signal based on the test signal VS2 of the second analog signal.

At a time t52, the reference-signal supply unit 25 stops changing the potential of the reference signal Vr2 depending on time.

At a time t53, the TG 70 sets the signal S2 at L level.

At a time t54-1, the reference-signal supply unit 25 starts changing the potential of the reference signal Vr2 depending on time. Also, the selection circuit 302 sets the signal M1_En at H level. Then, at a time t54-2, the counter 40 starts the counting operation of the clock signal.

At a time t55, the magnitude relationship between the test signal VS2 and the reference signal Vr2 is reversed, and the signal value of the latch signal LATCH is changed. The first memory 502 holds the count signal at this time. The count signal held in the first memory 502 is expressed as digital signal DS2 in this embodiment. The digital signal DS2 is a seventh digital signal based on the test signal VS2 of the second analog signal.

At a time t56, the reference-signal supply unit 25 stops changing the potential of the reference signal Vr2 depending on time.

At the time t56 and later, the horizontal scan circuit 60 successively transfers signals held in the first memory 502 and the second memory 503 of each column to the DSP 90.

A signal value of a digital signal obtained if the correction operation in this embodiment is not executed is described below with reference to FIG. 10B. X in FIG. 10B indicates a case in which a digital signal is generated by using the reference signal Vr1. Y1 indicates a case in which the ratio of the changing quantity of the potential per unit time for the reference signal Vr2 is quadruple of the changing quantity of the potential per unit time for the reference signal Vr1. In contrast, Y2 indicates a case in which the ratio of the changing quantity of the potential per unit time for the reference signal Vr2 is smaller than the quadruple of the changing quantity of the potential per unit time for the reference signal Vr1 due to an error. At the boundary 10 between the region I-L and the region I-H, signal values of digital signals obtained by X and Y1 are respectively D1 and D2 as described above with reference to FIG. 1B. Further, in a case of Y2, the ratio of the changing quantity of the potential per unit time for the reference signal Vr2 with respect to the changing quantity of the potential per unit time for the reference signal Vr1 is smaller than the quadruple due to an error. Hence, the signal value of the obtained digital signal is D3 which is smaller than D2. In this embodiment, the correction operation is executed for decreasing the difference between the signal values of the digital signals generated between X and Y2.

Next, the correction operation of this embodiment is described. The DSP 90, which serves as a correction unit of this embodiment, acquires a correction value β from Expression (10) as follows.

$$\beta=(DS1-DN1)/(4\times(DS2-DN2)) \quad (10)$$

Next, correction processing using the correction value β is described.

In the operation described above with reference to FIG. 5, the DSP 90 quadruples the signal value of the digital signal held in the first memory 502 of a column with the flag memory 501 being at L level. Then, the DSP corrects the digital signal, which is the quadrupled signal value, by Expression (11).

$$CAL\_DS=ED\_DS\times\beta \quad (11)$$

ED_DS in Expression (11) is a digital signal, in which the DSP 90 quadruples the signal value of the digital signal held in the first memory 502 of the column with the flag memory 501 being at L level. CAL_DS is a digital signal after correction output from the DSP 90. Expression (11) represents that CAL_DS is obtained by multiplying ED_DS by the correction value β.

The imaging device of this embodiment can also obtain an advantage similar to that of the first embodiment. Further, with the imaging device of this embodiment, an error of a digital signal generated because the ratio of changing quantities of potentials per unit time among a plurality of reference signals varies.

Figure 10A:
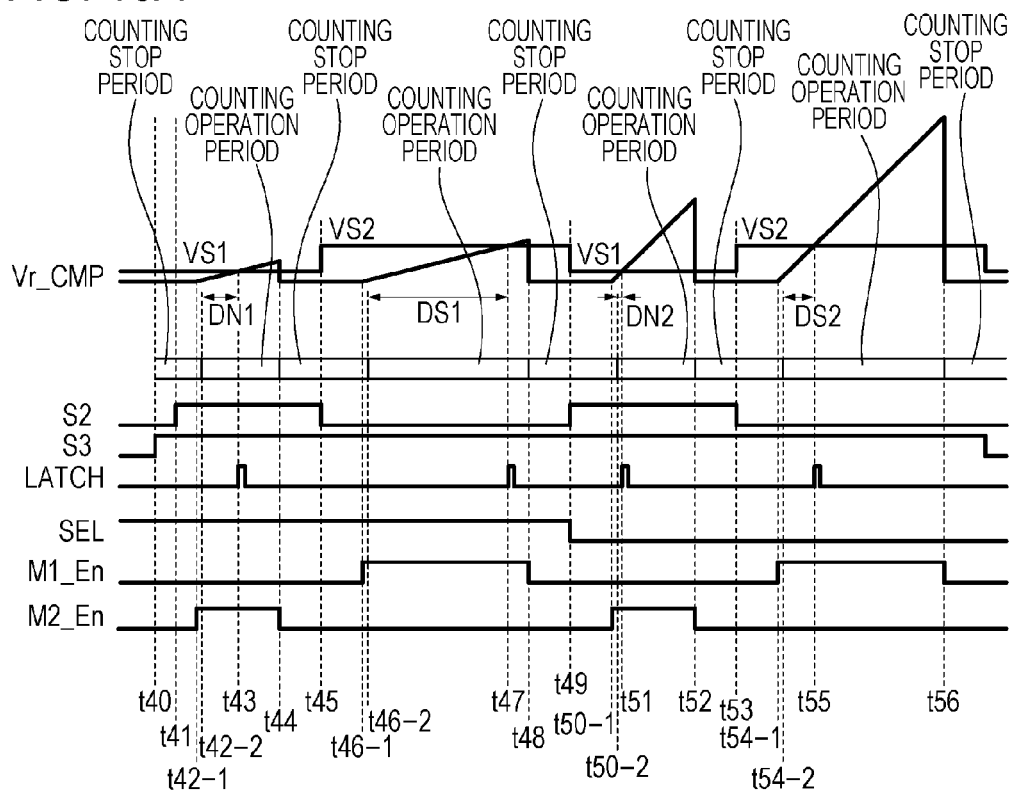
FIG. 10A is a timing chart showing other example of an operation of the imaging device.
Figure 10B:
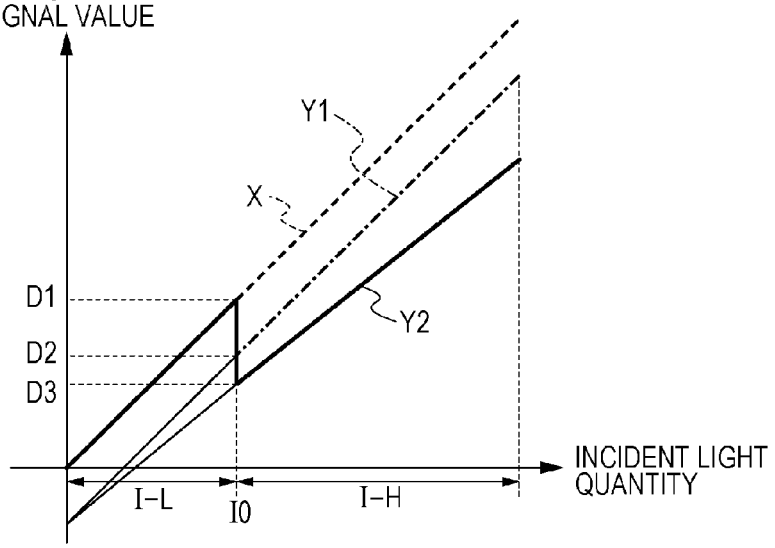
FIG. 10B illustrates the relationship between an incident light quantity and a digital signal value.

In the operation shown in FIG. 10A of this embodiment, the order of generation of the digital signals is DN1, DS1, DN2, and DS2. Alternatively, for example, the order of generation of the digital signals may be DN1, DN2, DS1, and DS2. In this form, the first memory 502 holds the digital signal DN1, and the second memory 503 holds the digital signal DN2. Then, the horizontal scan circuit 60 transfers the digital signals from the memory unit 50 of each column successively to the DSP. Then, the first memory 502 holds the digital signal DS1, and the second memory 503 holds the digital signal DS2. Then, the horizontal scan circuit 60 may transfer again the digital signals from the memory unit 50 of each column successively to the DSP.

The above-described form in which the digital signals are obtained in the order of the digital signals DN1, DN2, DS1, and DS2 is described again. In this form, as compared with the example in FIG. 10A, the same test signal VS1 can be converted into the digital signal. Accordingly, a variation in noise component included in the digital signal DN1 and the digital signal DN2 can be decreased. A variation in noise component may be similarly decreased even when a signal output from the pixel 1 is used instead of the test signal output from the test-signal supply unit 200. That is, AD conversion may be executed on the signal based on the noise signal of the pixel 1 by using each of the reference signals Vr1 and Vr2. Then, AD conversion may be executed on the signal based on the photoelectric conversion signal of the pixel 1 by using each of the reference signals Vr1 and Vr2. Even with this form, the correction value β in Expression (10) can be obtained. Then, as compared with the configuration that executes AD conversion in the order in FIG. 10A, a variation is hardly generated in each of the signal values of the noise signal and the photoelectric conversion signal which are converted by AD conversion by suing the reference signals Vr1 and Vr2. Hence, digital signals with a variation in signal values of the noise signal and the photoelectric conversion signal decreased can be obtained. Accordingly, the correction value β can be more correctly obtained. This advantage is not limited to the form in which the digital signals are obtained in the order of digital signals DN1, DN2, DS1, and DS2. Generation operations for two digital signals based on the test signal VS1 are successively executed. Also, generation operations for two digital signals based on the test signal VS2 are successively executed. For example, the generation order of the digital signals may be DN2, DN1, DS2, and DS1. Alternatively, the order may be DS1, DS2, DN2, and DN1.

Also, in the imaging device of this embodiment, the form, in which the digital signal generated by using the reference signal Vr2 is corrected, is described. Alternatively, the digital signal generated by using the reference signal Vr1 may be corrected. That is, the digital signal held in the first memory 502 of the column with the flag memory 501 being at H level is divided by the correction value β. Accordingly, an advantage similar to that of the imaging device of the above-described embodiments can be obtained. Also, with the imaging device of this embodiment, an error of a digital signal generated because the ratio of changing quantities of potentials per unit time among a plurality of reference signals varies can be decreased.

In this specification, the form, in which the counter 40 supplies the common count signal to the AD converter 110 of each column, is described. Alternatively, the AD converter 110 of each column may include a counter. In an example of this form, the AD converter 110 of each column includes a counter, a flag memory, a first memory, and a second memory. Even with this form, the operations of the counter, flag memory, first memory, and second memory may be similar to the operations described in each of the embodiments.

The above-described operation may be executed, for example, before the imaging device is installed in an imaging system and the correction value β may be stored in a correction-value memory included in the imaging system. Also, if the correction value β is acquired prior to an imaging operation, a decrease in AD-conversion accuracy, due to a variation in reference signal depending on the environmental condition such as temperature, can be reduced.

In this specification, the form, in which the time-dependent change in potential of the reference signal is made in a slope shape, is described; however, the reference signal having a potential that is changed in a step shape, may be employed. The reference signal having a potential that is changed in a step shape, is also an example of the reference signal having a potential that is changed depending on time.

Also, the correction value β of this embodiment may be provided for the AD converter 110 of each column. Alternatively, correction values β may be obtained by using digital signals output from AD converters 110 of a plurality of columns, an average value of the correction values may be obtained, and the average value may be used by the DSP 90. Still alternatively, AD converters 110 of all columns may be divided into a plurality of blocks, and an average value of correction values β may be obtained for each block. For example, if buffers that relay count signals are provided for respective AD converters 110 of a plurality of columns, blocks may be formed for respective buffers. This is because a buffer may cause generation of a delay of the count signal. Further, the difference between the start of the time-dependent change in potential of the reference signal and the input timing of the count signal to each column of the memory unit 50 may vary depending on the buffer. To obtain the correction value β, first digital signals and second digital signals of the AD converters 110 of the plurality of columns may be each averaged, and a correction value β common to the AD converters 110 of the plurality of columns may be obtained by using the difference between the average first digital signal and the average second signal.

Also, the correction operation of this embodiment may be executed immediately after power of the imaging device is turned ON. Alternatively, the correction operation may be executed in a blanking period after the vertical scan circuit 15 scans all rows of the pixel unit 10 until scanning of the pixel unit 10 is started next.

Fourth Embodiment

An imaging device according to this embodiment is described below with reference to the drawings, mainly for a point different from the first embodiment. The same reference signs are applied to elements having the functions as those in the first embodiment.

Figure 11:
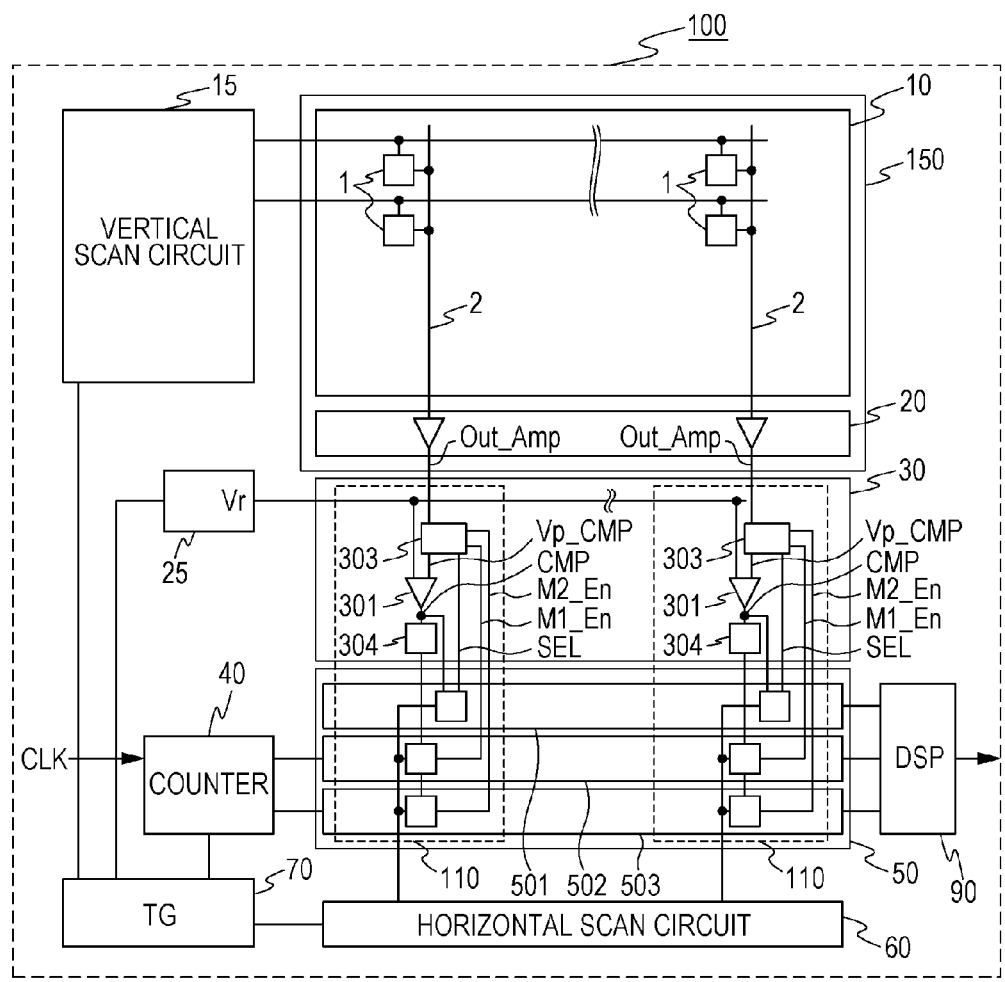
FIG. 11 illustrates other configuration of the imaging device.

FIG. 11 illustrates a configuration of an imaging device according to this embodiment.

The imaging device of this embodiment differs from the imaging device in the first embodiment for the configuration of the comparison unit 30. The comparison unit 30 includes the comparison circuit 301, the gain selection circuit 303, and the latch circuit 304. The signal Out_Amp of the amplifier 20 is input to the gain selection circuit 303. The gain selection circuit 303 selects one of two different gains based on the selection signal SEL generated in the flag memory 501, amplifies the signal Out_Amp into a signal Vp_CMP, and outputs the signal Vp_CMP to the comparison circuit 301. The gain selection circuit 303 is a gain unit that amplifies the signal Out_Amp of the amplifier 20. For easier understanding, the gains are described as the gain ×1 and the gain ×¼. The gain ×1 is a first gain, and the gain ×¼ is a second gain having a smaller absolute value than that of the first gain. In this specification, the gain ×1 (multiplication by 1) and the gain ×¼ (multiplication by ¼) are assumed as gains for amplification. The comparison circuit 301 compares the signal Vp_CMP with the reference signal Vr output from the reference-signal supply unit 25, and outputs a comparison signal CMP. When the comparison result signal CMP becomes H level, the latch circuit 304 outputs a signal, which becomes H level for a predetermined period, to the memory unit 50. The flag memory 501 generates a selection signal SEL based on the comparison result signal CMP, and outputs the selection signal SEL to the gain selection circuit 303. Also, the gain selection circuit 303 outputs a signal M1_En and a signal M2_En to the first memory 502 and the second memory 503 in accordance with the gain selected by the selection signal SEL. The signal M1_En is a signal for control of enabling or disabling writing data in the first memory 502. Also, the signal M2_En is a signal for control of enabling or disabling writing data in the second memory 503.

Figure 12:
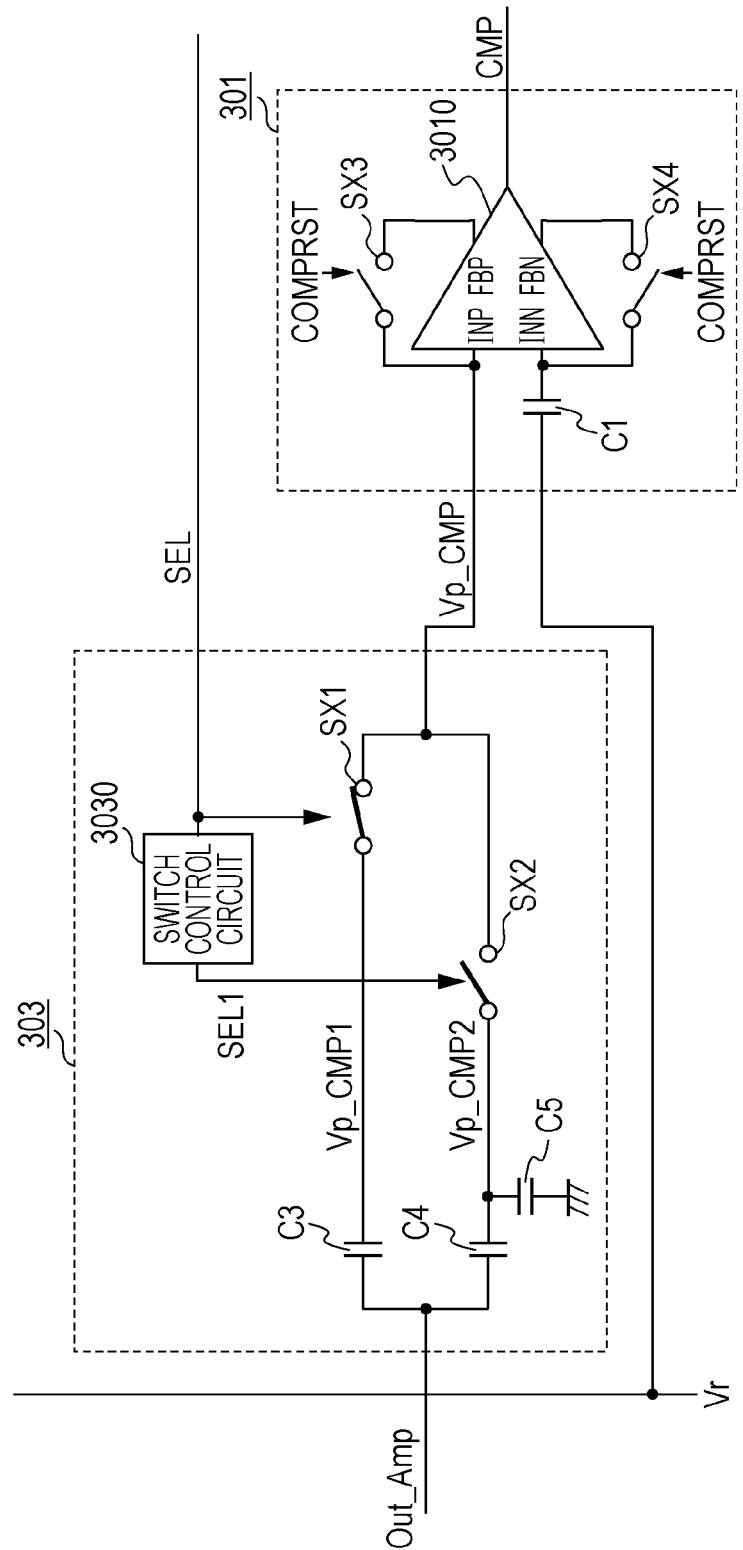
FIG. 12 illustrates configurations of a gain selection circuit and a comparison circuit.

FIG. 12 illustrates the gain selection circuit 303 and the comparison circuit 301 of this embodiment.

The gain selection circuit 303 includes a capacitative element C3, a capacitative element C4, a capacitative element C5, a switch SX1, a switch SX2, and a switch control circuit 3030. The signal Out_Amp is connected to one ends of the capacitative elements C3 and C4. The other end of the capacitative element C3 is connected to one end of the switch SX1, and outputs a signal Vp_CMP1. Also, one terminal of one end of the capacitative element C4 is connected to one end of the capacitative element C5, which is connected to the GND potential, and one end of the switch SX2, and outputs a signal Vp_CMP2. The capacitance ratio of the capacitative elements C4 and C5 is 1:3. Further, the other end of the switch SX1 and the other end of the switch SX2 are connected to each other, and output a signal Vp_CMP to the comparison circuit 301. The switch SX1 is controlled by the selection signal SEL. The switch SX1 becomes conductive if the selection signal SEL is at H level. The switch SX1 becomes non-conductive if the selection signal SEL is at L level. The switch SX2 is controlled by a selection signal SEL1.

The comparison circuit 301 includes the comparator 3010, a switch SX3, and a switch SX4. The signal Vp_CMP is input to an input node INP of the comparator 3010. Also, the reference signal Vr is input to the other input node INN through a capacitance C1. Also, the switch SX3 is provided in an electrical path between the input node INP and an output node FBP. Also, the switch SX4 is provided in an electrical path between the input node INN and an output node FBN. The switches SX3 and SX4 are controlled by the signal COMPRST. If the signal CMPRST is at H level, the switches SX3 and SX4 become conductive. At this time, the potentials of the input node INP and the input node INN are reset.

The above-described configuration is the configuration of the comparison unit 30 in this embodiment.

In the above-described configuration, the signal Vp_CMP1 is a signal obtained by multiplying the signal Out_Amp by the gain ×1, and the signal Vp_CMP2 is a signal obtained by multiplying the signal Out_Amp by the gain ×¼. The two signals Vp_CMP1 and Vp_CMP2 are connected to the output terminal of the gain selection circuit 303 by the switches SX1 and SX2. Consequently, the gain selection circuit 303 outputs the signal Vp_CMP1, which is obtained by multiplying the signal Out_Amp by one, as the signal Vp_CMP if only the switch SX1 is conductive. Also, the gain selection circuit 303 outputs the signal Vp_CMP2, which is ×¼ of the signal Out_Amp, if only the switch SX2 is conductive.

Figure 13:
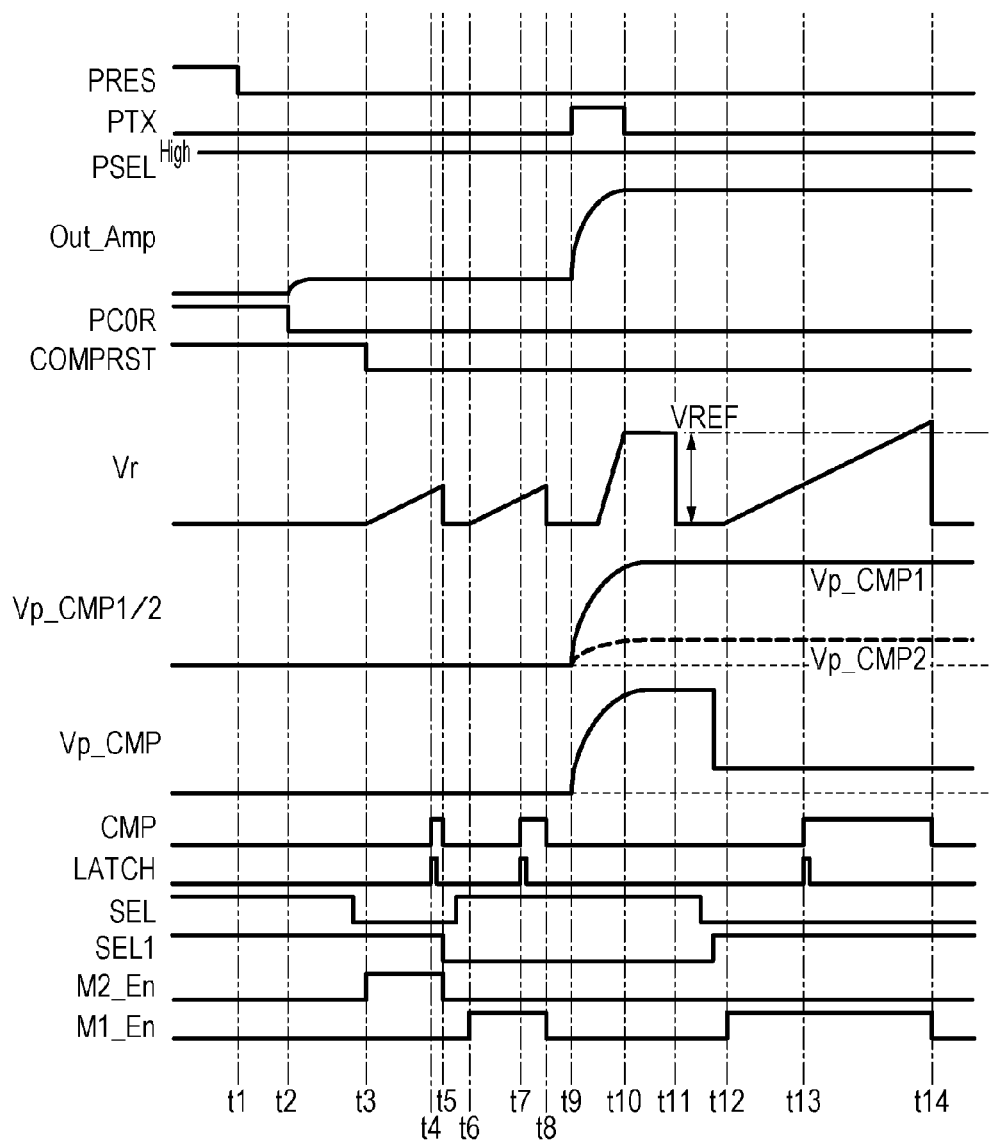
FIG. 13 illustrates other operation of the imaging device.

Then, the operation in this embodiment is described, with reference to an operation timing chart of this embodiment shown in FIG. 13.

First, pixels in the row with the signal PRES being at H level, the signal PTX being at L level, and the signal PSEL being at H level are reset. At this time, since the signal PC0R and the signal COMPRST are also at H level, an amplification unit 20 and the comparator 3010 are reset. Further, the selection signal SEL and the selection signal SEL1 are at H level, and the switches SX1 and SX2 are conductive. Accordingly, the signal Vp_CMP1 and the signal Vp_CMP2 are reset to have the same potential as that of the input node INP of the comparator 3010. It is to be noted that, since the signal M1_En and the signal M2_En at L level are output, a digital signal is not written in the first memory 502 or the second memory 503.

At a time t1, the vertical scan circuit 15 changes the level of the signal PRES from H level to L level. Accordingly, the reset signal is output from the pixel 1.

At a time t2, the TG 70 changes the level of the signal PC0R from H level to L level. Accordingly, the capacitative element C0 holds a charge based on the reset signal output from the pixel 1. The amplifier 20 outputs the signal Out_Amp including an offset of the differential amplifier 201.

The TG 70 forcibly sets the selection signal SEL at L level in a period from the time t2 to a time t3. Accordingly, the switch SX1 becomes non-conductive, and the signal Vp_CMP1 holds the potential based on the reset potential. At this time, in the gain selection circuit 303, since the selection signal SEL1 holds H level, the gain is ×¼. The signal output from the gain selection circuit 303 is an amplified noise signal in which the noise signal is amplified.

At the time t3, the TG 70 sets the signal COMPRST at L level. At this time, the input nodes INN and INP of the comparator 3010 hold the potentials based on the reset potential. Then, the reference-signal supply unit 25 starts changing the potential of the reference signal Vr depending on time. In response to the start of the change in potential of the reference signal Vr, the gain selection circuit 303 sets the signal M2_En at H level.

At a time t4, the magnitude relationship between the signal output form the amplifier 20 and the reference signal Vr_CMP is reversed, and the signal value of the comparison result signal CMP is changed. Accordingly, the latch signal LATCH outputs a pulse at H level. The second memory 503 holds the count signal at a timing when the level of the latch signal LATCH is lowered.

At a time t5, the reference-signal supply unit 25 stops the time-dependent change in potential of the reference signal Vr, and sets the potential of the reference signal Vr at the potential at the time t3. Also, the gain selection circuit 303 sets the signal M2_En at L level. Then, the switch SX2 becomes non-conductive.

The TG 70 forcibly sets the selection signal SEL at H level in a period from the time t5 to a time t6. Accordingly, the switch SX1 becomes conductive. Hence, the gain selection circuit 303 selects the gain ×1. The signal output from the gain selection circuit 303 is the amplified noise signal in which the noise signal is amplified.

At the time t6, the reference-signal supply unit 25 starts changing the potential of the reference signal Vr depending on time. At this time, in response to the start of the change in potential of the reference signal Vr, the gain selection circuit 303 sets the signal M1_En at H level.

At a time t7, the magnitude relationship between the signal output form the amplifier 20 and the reference signal Vr_CMP is reversed, and the signal value of the comparison result signal CMP is changed. Accordingly, the latch signal LATCH outputs a pulse at H level. The first memory 502 holds the count signal at a timing when the level of the latch signal LATCH is lowered.

At a time t8, the reference-signal supply unit 25 stops the time-dependent change in potential of the reference signal Vr2, and sets the potential of the reference signal Vr at the potential at the time t3. The gain selection circuit 303 sets the signal M1_En at L level.

In the above-described operation, the count signal held by the first memory 502 at the time t7 is a first digital signal. Also, the digital signal held in the second memory 503 at the time t4 is a second digital signal.

Then, at a time t9, the vertical scan circuit 15 sets the signal PTX at H level. Accordingly, the pixel 1 outputs the photoelectric conversion signal to the vertical signal line 2. Since the capacitative element C0 holds the charge based on the noise component of the pixel 1, the photoelectric conversion signal, from which the noise component of the pixel is subtracted, is output to the differential amplifier 201. Accordingly, the amplifier 20 amplifies the photoelectric conversion signal, from which the noise component of the pixel is subtracted, and outputs the amplified signal as the signal Out_Amp to the comparison unit 30. The input node INN of the comparison circuit 301 holds the potential based on the offset of the differential amplifier 201 at the time t3. Hence, the input node INN of the comparison circuit 301 receives a signal, which is obtained by subtracting the offset of the differential amplifier 201 from the signal Out_Amp.

At a time t10, the reference-signal supply unit 25 sets the potential of the reference signal Vr at the potential VREF. Regarding the potential VREF, if the signal Out_Amp output from the amplifier 20 is larger than the potential VREF, the comparison circuit 301 outputs the comparison result signal CMP at L level. In contrast, if the signal Out_Amp is smaller than the potential VREF, the comparison circuit 301 outputs the comparison result signal CMP at H level. In this case, the description is given based on an assumption that the comparison result signal CMP output from the comparison circuit 301 is at L level.

In a period from the time t10 to a time t11, the flag memory 501 holds the comparison result signal CMP at L level.

At the time t11, the reference-signal supply unit 25 changes the potential of the reference signal Vr to be equal to the potential at the time t3.

In a period from the time t11 to a time t12, the flag memory 501 causes the signal level of the selection signal SEL to be the same as the signal level of the comparison result signal CMP held in the flag memory 501. In this case, since the flag memory 501 holds L level, the selection signal SEL becomes L level. Accordingly, the switch control circuit 3030 sets the selection signal SEL1 at H level. Consequently, the switch SX1 becomes non-conductive and the switch SX2 becomes conductive. Accordingly, the signal Vp-CMP2 is output as the signal Vp_CMP. If the comparison result signal CMP held in the flag memory 501 is at H level, the selection signal SEL is held at H level, and the signal Vp_CMP1 is output as the signal Vp_CMP. The signal output from the gain selection circuit 303 is the amplified photoelectric conversion signal, in which the photoelectric conversion signal is amplified.

At the time t12, the reference-signal supply unit 25 starts changing the potential of the reference signal Vr depending on time. The gain selection circuit 303 sets the signal M1_En at H level. Accordingly, the signal of the first memory 502, which has held the first digital signal, can become rewritten. If the comparison result signal CMP held in the flag memory 501 is at H level, the gain selection circuit 303 sets the signal M2_En at H level. At this time, the signal of the second memory 503, which has held the second digital signal, can become rewritten.

At a time t13, the magnitude relationship between the signal output form the amplifier 20 and the reference signal Vr_CMP is reversed, and the signal value of the comparison result signal CMP is changed. The first memory 502 holds the count signal at this time.

At the time t14, the reference-signal supply unit 25 stops the time-dependent change in potential of the reference signal Vr, and sets the potential of the reference signal Vr at the potential at the time t3. The gain selection circuit 303 sets the signal M1_En at L level.

In the above-described operation, the count signal held in the first memory 502 at the time t13 is a third digital signal based on the photoelectric conversion signal.

Further, after the time t14, the horizontal scan circuit 60 successively scans the memory unit 50, and causes the flag memory 501, the first memory 502, and the second memory 503 of each column to output digital signals held in the respective memories to the DSP 90.

The DSP 90 executes digital processing on the values output from the first memory 502 and the second memory 503, in accordance with the value output from the flag memory 501.

If L level is output from the above-described flag memory 501, the DSP 90 subtracts the second digital signal held in the second memory 503 from the third digital signal held in the first memory 502. At this time, the third and first digital signals are a digital signal based on the photoelectric conversion signal generated by multiplying the signal Vout_Amp by the gain ×¼, and a digital signal based on the noise signal generated by multiplying the signal Vout_Amp by the gain ×¼. Hence, by subtracting the second digital signal from the third digital signal, influence of a variation in characteristic depending on the column of the comparison unit 30 can be decreased. That is, the DSP 90 generates a digital S signal with a less noise signal.

If H level is output from the above-described flag memory 501, the DSP 90 subtracts the first digital signal held in the first memory 502 from the third digital signal held in the second memory 503. At this time, the third and first digital signals are a digital signal based on the photoelectric conversion signal generated by multiplying the signal Vout_Amp by the gain ×1, and a digital signal based on the noise signal generated by multiplying the signal Vout_Amp by the gain ×1. Hence, the DSP 90 generates a digital S signal with a less noise signal, similarly to the case in which L level is output from the flag memory 501.

Finally, the DSP 90 executes digital gain processing on the digital S signal, in accordance with the value output from the flag memory 501. For a column in which AD conversion is executed by multiplying the signal Vout_Amp by the gain ×¼, that is, for a column where L level is output from the flag memory 501, a signal obtained by quadrupling the digital S signal is output. Also, for a column where H level is output from the flag memory 501, the digital S signal is output without digital gain processing on the digital S signal. Accordingly, the digital signal, which is finally output from the DSP 90, can obtain an equivalent AD-conversion gain with any gain being selected for each column of the comparison unit 30.

As described above, with this embodiment, an advantage similar to that of the first embodiment can be provided by the above-described configuration.

In the form described in this embodiment, the gain selection circuit 303 is provided in the comparison unit 30 separately from the comparison circuit 301. However, a portion of the gain selection circuit may be common to the comparison circuit 301. Also, the amplifier 20 may have a function of switching a gain.

Fifth Embodiment

An imaging device according to this embodiment is described below with reference to the drawings, mainly for a point different from those of the second and fourth embodiments. This embodiment is described based on an assumption that an attenuation ratio of a signal from the amplifier 20 is ¼.

Figure 14:
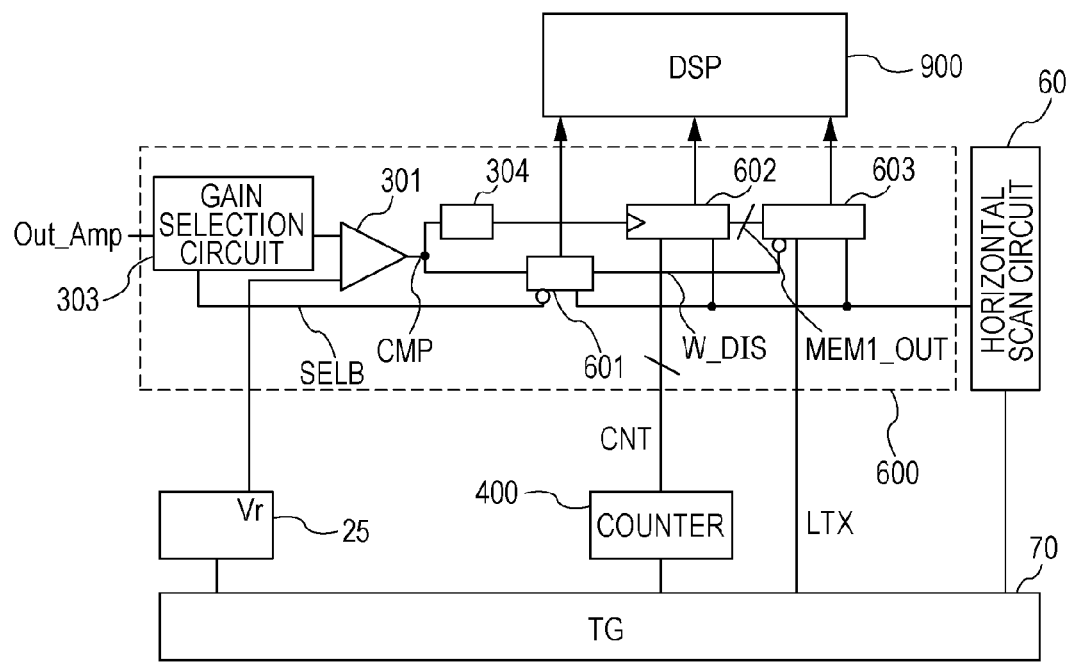
FIG. 14 illustrates a configuration of a portion of the imaging device.

FIG. 14 is a configuration diagram including peripheral circuits arranged downstream of an AD converter 600 and the amplifier 20 in the imaging device according to this embodiment. The output signal Out_Amp of the amplifier 20 and the selection signal SELB output from the flag memory 601 are input to the gain selection circuit 303. The gain selection circuit 303 has a function of attenuating the signal Out_Amp of the amplifier 20 to be ¼. If the selection signal SELB is at L level, the gain selection circuit 303 outputs the signal Out_Amp of the amplifier 20 to the comparison circuit 301. Hereinafter, the signal Out_Amp of the amplifier 20 output from the gain selection circuit 303 is expressed as high-gain signal. In contrast, if the selection signal SELB is at H level, the gain selection circuit 303 outputs a signal, obtained by multiplying the signal Out_Amp of the amplifier 20 by ¼, to the comparison circuit 301. Hereinafter, the signal output form the gain selection circuit 303 if the selection signal SELB is at H level is expressed as low-gain signal.

In the imaging device of this embodiment, similarly to the fourth embodiment, the reference-signal supply unit 25 supplies a single reference signal Vr to the comparison circuit 301.

Figure 15A:
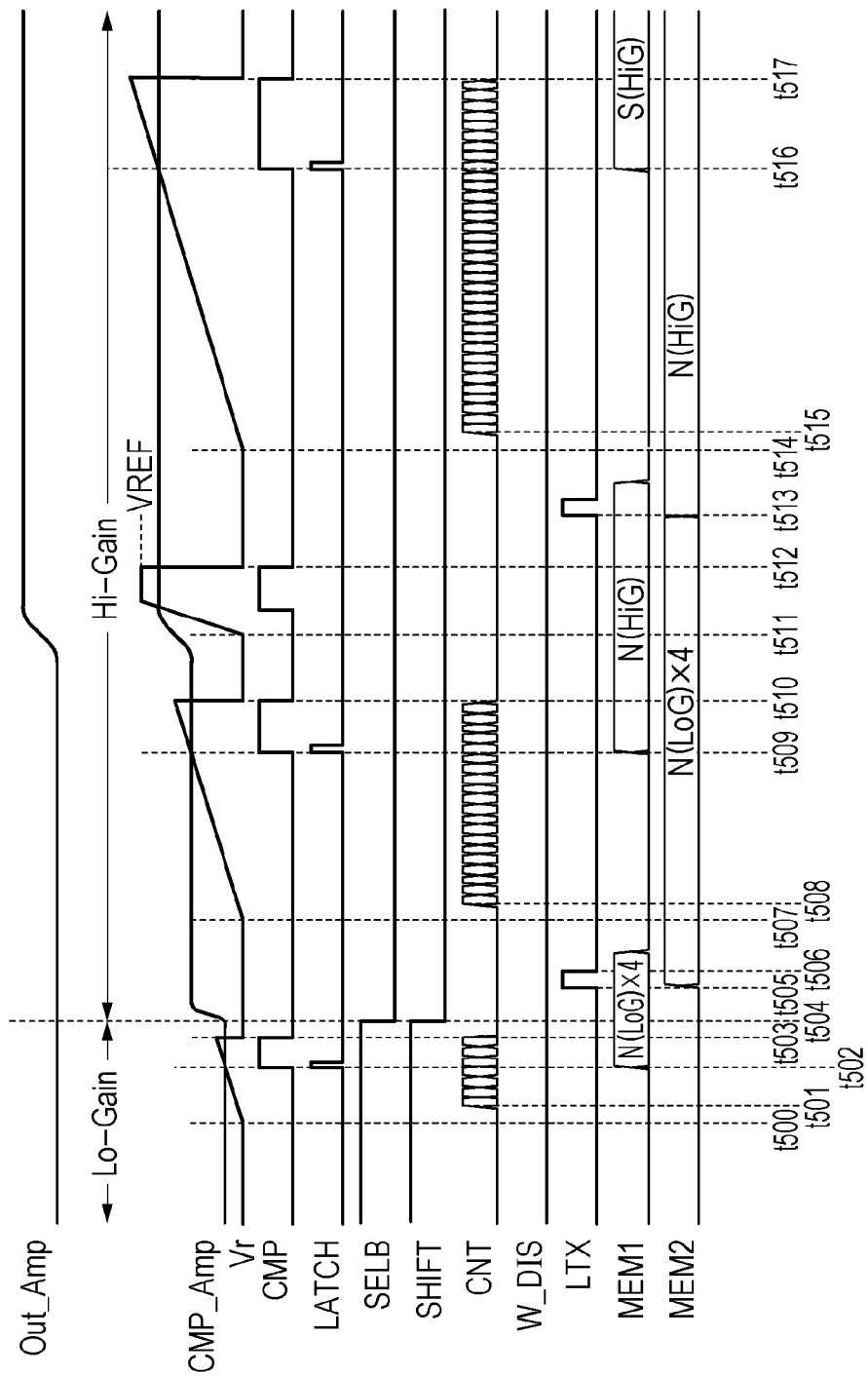
FIG. 15A illustrates other operation of the imaging device.

Next, an operation of the AD converter 600 in the imaging device according to this embodiment is described with reference to a timing chart in FIG. 15A. In FIG. 15A, it is assumed that a signal based on the noise signal is output as the signal Out_Amp of the amplifier 20. Also, similarly to FIG. 7B, a column with a smaller output signal of the amplifier 20 based on the photoelectric conversion signal than the potential VREF is described. A case, in which the output signal is larger than the potential VREF, is described later with reference to FIG. 15B.

At a time t500, since the selection signal SELB is at H level, the gain selection circuit 303 outputs the low-gain signal as CMP_Amp. The time-dependent change in potential of the reference signal Vr is started, and at a time t501, the counter 400 starts the counting operation. At the same time, since the shift signal SHIFT is at H level, the count signal CNT, which is shifted by two bits, is output to the AD converter 600.

At a time t502, the magnitude relationship between the signal Out_Amp of the amplifier 20 and the reference signal Vr is reversed, and the level of the comparison result signal CMP is changed to H level. With this change, the level of the latch signal LATCH is changed from L level to H level for a predetermined period, and the first memory 602 holds the count signal CNT at a timing when the level is lowered. It is assumed that the digital signal held at this time is N(LoG)×4. Since this data is shifted by two bits, lower-order two bits hold "zero (0)."

At a time t503, the change in potential of the reference signal Vr is stopped. The potential of the reference signal Vr is returned to the potential at the time t500, and the comparison result signal CMP is changed to L level. Also, the counter 400 stops the counting operation. At a time t504, the selection signal SELB is set at L level, and the gain selection circuit 303 outputs the high-gain signal as CMP_Amp. The timing of change of the selection signal SELB from H level to L level does not have to be the time t504, and may be between the time t503 and a time t507. Also, the reset of the count signal CNT and the timing of change of the shift signal SHIFT from H level to L level may be between the time t503 and a time t508.

The transfer control signal LTX is set at H level between a time t505 and a time t506. Accordingly, a digital signal N(LoG)×4 is replicated and held in the second memory 603. Then, the change of the reference signal Vr and the counting operation of the counter 400 are started at the time t507 and the time t508. The magnitude relationship between the signal Out_Amp of the amplifier 20 and the reference signal Vr is reversed at a time t509. The level of the comparison result signal CMP is changed to H level. The digital signal N(HiG) is held in the first memory 602 at a timing when the latch signal LATCH is lowered.

At a time t510, the change in potential of the reference signal Vr1 is stopped, the potential is returned to the potential at the time t508, and before a time t515, the operation of the counter 400 is stopped and the counter 400 is reset.

The signal based on the photoelectric conversion signal is output from the amplifier 20 in a period from the time t510 to a time t511, and the potential of the signal Out_Amp is changed. At the time t511, the operation of changing the potential of the reference signal Vr to the potential VREF is started. In FIG. 15A, since the signal Out_Amp of the amplifier 20 is smaller than the potential VREF, the comparison result signal CMP becomes at H level, and the result is held in the flag memory 601. The selection signal SELB is an inversion signal of the signal held in the flag memory 601. Hence, the selection signal SELB is continuously held at L level and continuously has high gain. At a time t512, the potential of the reference signal Vr1 is returned to the potential at the time t511.

For a predetermined period from a time t513, the TG 70 sets the transfer-control signal LTX at H level. At the same time, the write-control signal W_DIS is at L level. Accordingly, the digital signal N(LoG)×4 held in the second memory 603 is rewritten by the digital signal N(HiG) output from the first memory 602.

The operation at the time t515 or later is similar to the operation described with reference to FIG. 7B except that the digital signal S(HiG) is held in the first memory 602 at a time t516.

Next, a column in which the output signal amplitude of the amplifier 20 based on the photoelectric conversion signal is larger than the potential VREF is described with reference to a timing chart in FIG. 15B. The operation before a time t511-2 is the same as the operation in FIG. 15A, and hence the description is omitted.

In a period from the time t511-2 to a time t512-2, since the amplitude of the signal Out_Amp of the amplifier 20 is larger than the potential VREF, the comparison result signal CMP outputs L level, and the result is held in the flag memory 601. In response to a control signal (not shown), the signal at H level, which is an inversion signal of the signal held in the flag memory 601, is output as the selection signal SELB. Accordingly, the gain selection circuit 303 outputs the low-gain signal to the comparison circuit 301. Hence, the signal CMP_Amp, which is an input signal of the comparison circuit 301, is changed. The timing at which the selection signal SELB is inverted may be in a period from the time t512-2 to a time t514. Also, based on the result held in the flag memory 601 in the period from the time t512-2 to the time t513-2, the level of the write-control signal W_DIS is changed to H level.

In a predetermined period from the time t513-2, the TG 70 sets the transfer-control signal LTX at H level. At the same time, the write-control signal W_DIS is at H level. Hence, the memory circuit 611-0 and the memory circuit 611-1 at lower-order two bits are allowed to be written. Accordingly, the digital signal N(HiG)[1:0], which is the lower-order two bits of the digital signal N(HiG), is written by the second memory 603. Hence, the second memory 603 holds the digital signal N(LoG)×4+N(HiG)[1:0]. The operation at the time t515 and later is similar to the operation described with reference to FIG. 15A except that the digital signal S(LoG) is held in the first memory 602 at a time t516-2.

As described above, in accordance with the magnitude relationship between the signal Out_Amp of the amplifier 20 based on the photoelectric conversion signal and the potential VREF, the following signals are held in the corresponding memories.

(AD converter 110 of Out_Amp<VREF)
Flag memory 601 . . . H level
First memory 602 . . . S(HiG)
Second memory 603 . . . N(HiG)
(AD converter 110 of Out_Amp>VREF)
Flag memory 601 . . . L level
First memory 602 . . . S(LoG)
Second memory 603 . . . N(LoG)×4+N(HiG)[1:0]

In the imaging device of the fourth embodiment, the polarity of differential processing is changed in accordance with the signal level of the flag memory 601. In contrast, in the imaging device of this embodiment, differential processing can be executed without changing the polarity of the differential processing. Also, an advantage similar to that of the imaging device of the fourth embodiment can be provided.

In this embodiment, AD conversion on the noise signal of the low-gain signal is executed prior to AD conversion on the noise signal of the high-gain signal. However, the order may be reversed.

Sixth Embodiment

An imaging device according to this embodiment is described below with reference to the drawings, mainly for a point different from those of the third and fourth embodiments. The same reference signs are applied to elements having the same functions as those of the third and fourth embodiments.

In the imaging device of this embodiment, an error of a digital signal generated when the gain ratio set by the gain selection circuit 303 varies depending on the column can be reduced, in addition to the advantage provided by the imaging device according to the fourth embodiment.

Figure 16:
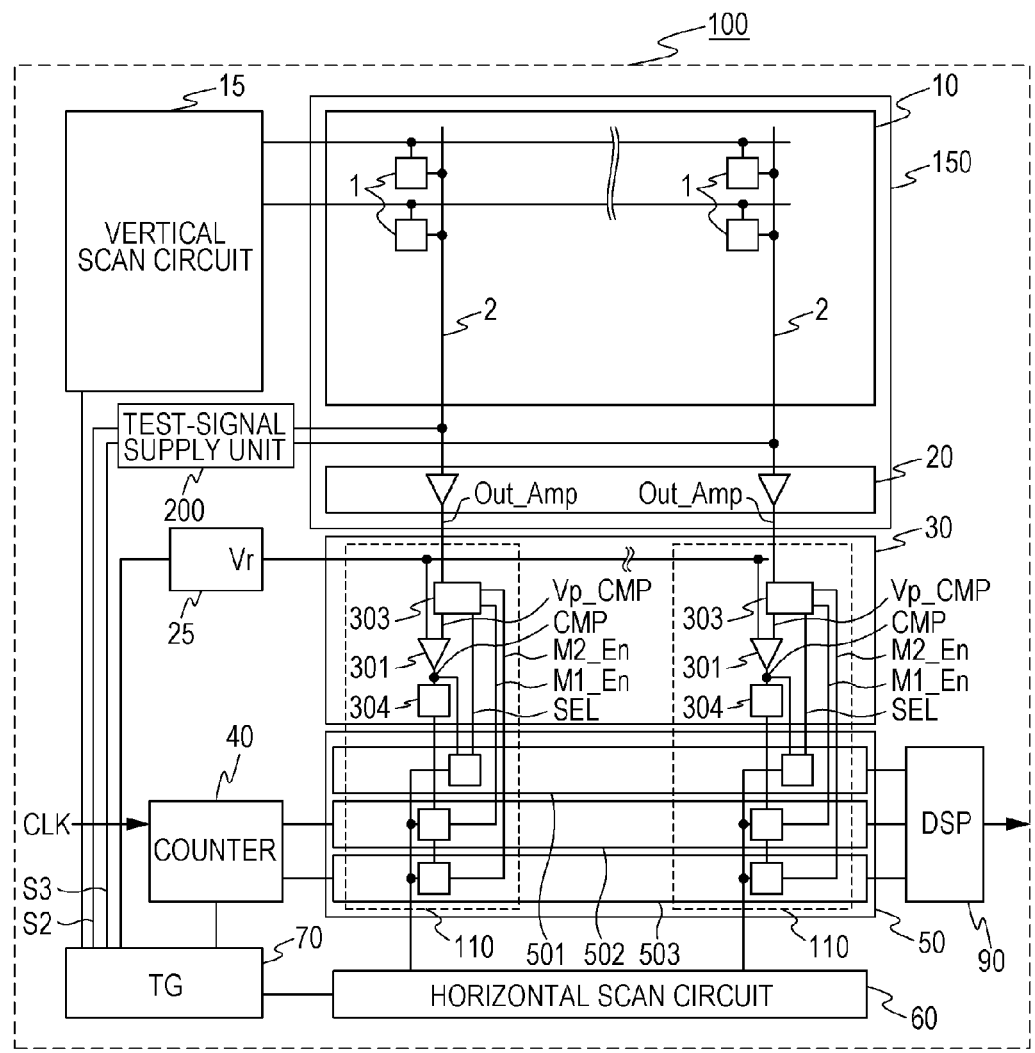
FIG. 16 illustrates other configuration of the imaging device.

FIG. 16 illustrates a configuration of the imaging device according to this embodiment. The imaging device according to this embodiment includes a test-signal supply unit 200 in addition to the configuration of the fourth embodiment. The test-signal supply unit 200 electrically connected to the vertical signal line 2 is provided. Signals S2 and S3 are output form the TG 70 to the test-signal supply unit 200. The configuration of the test-signal supply unit 200 according to this embodiment is similar to that of the third embodiment.

Figure 17:
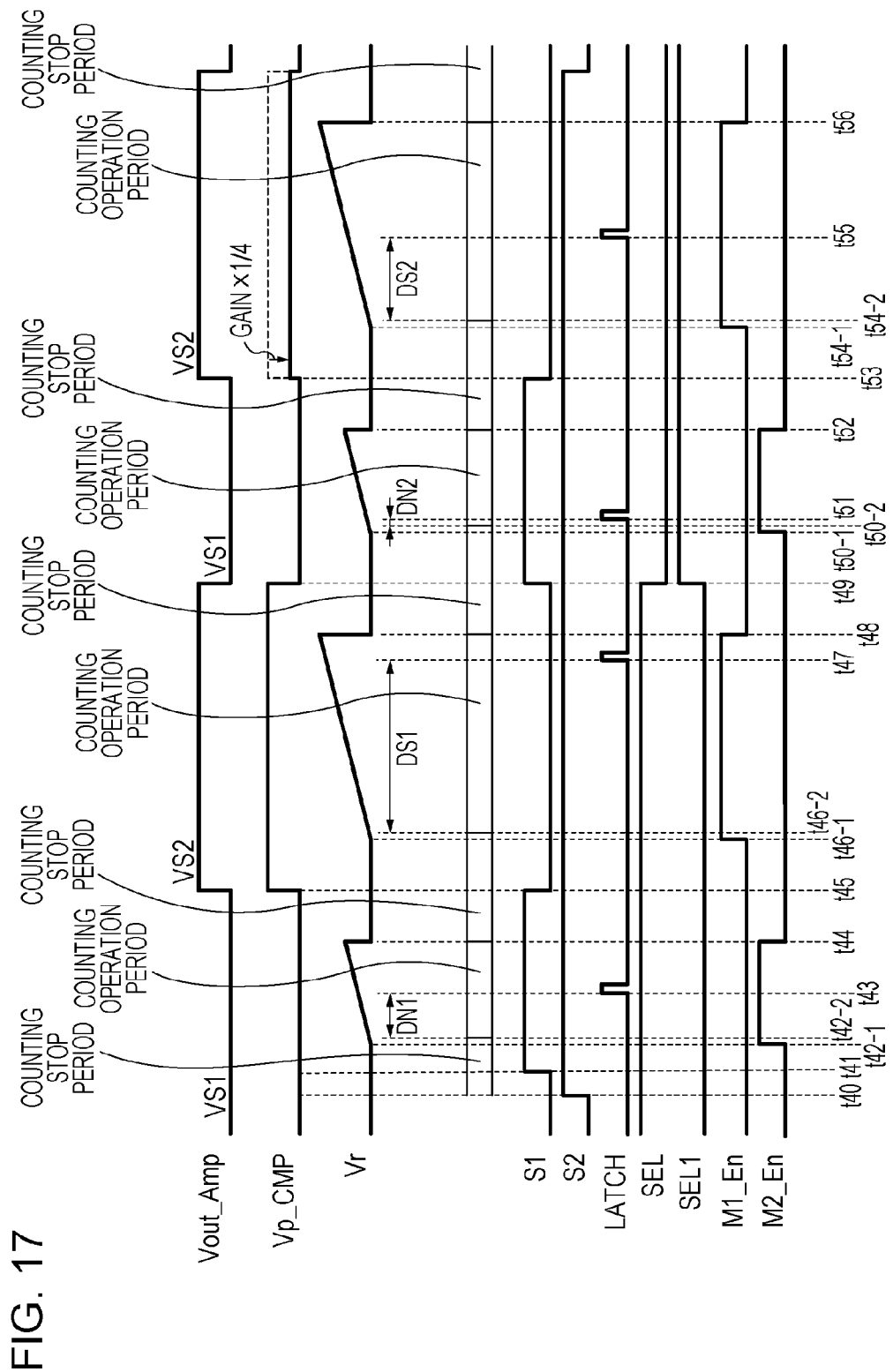
FIG. 17 illustrates other operation of the imaging device.

Next, an operation of this embodiment is described. FIG. 17 illustrates the operation of the imaging device according to this embodiment. The operation of the imaging device of this embodiment differs from the operation described with reference to FIG. 10A in the third embodiment, for the output operation of the reference signal Vr of the reference-signal supply unit 25, and the operation of the comparison unit 30. A correction operation, which is different from the third embodiment, is described below.

During the correction operation, the TG 70 controls the selection signal SEL by the control signal (not shown). Accordingly, the TG 70 controls the gain of the gain selection circuit 303. The gain selection circuit 303 amplifies test signals VS1, VS2, VN1, and VN2 based on the gain set in accordance with the selection signal SEL and outputs the signals. The signals are amplified analog signals.

From a time t42-1, the reference-signal supply unit 25 starts changing the potential of the reference signal Vr depending on time. The reference-signal supply unit 25 stops the change in potential at a time t44, and at the same time, returns the potential to the potential at the time t42-1. In the same period, since the selection signal SEL is at H level, the gain selection circuit 303 selects the gain ×1. Hence, in a period from the time t42-1 to the time t44, the comparison circuit 301 generates the comparison result signal CMP indicative of the result of comparison between the signal obtained by multiplying the signal based on the test signal VS1 by the gain ×1 and the signal based on the reference signal Vr. The count value of the counter 40 generated based on the timing at which the signal value of the comparison result signal CMP is changed is written as a digital signal DN1 in the second memory 503.

From a time t46-2, the reference-signal supply unit 25 starts changing the potential of the reference signal Vr depending on time again. The reference-signal supply unit 25 stops the change in potential at a time t48, and at the same time, returns the potential to the potential at a time t46-1. At the same time, since the selection signal SEL is at H level, the gain selection circuit 303 selects the gain ×1. Hence, in a period from a time t46-1 to the time t48, the comparison circuit 301 generates the comparison result signal CMP indicative of the result of comparison between the signal obtained by multiplying the signal based on the test signal VS2 by the gain ×1 and the signal based on the reference signal Vr. The count value of the counter 40 generated based on the timing at which the signal value of the comparison result signal CMP is changed is written as a digital signal DS1 in the first memory 502.

In a period from the time t48 to the time t50-1, the horizontal scan circuit 60 transfers the obtained digital signal DN1 and digital signal DS1 to the DSP 90.

The reference-signal supply unit 25 executes again the operation from the time t42-1 to the time t48 in a subsequent period from the time t50-1 to a time t56. In the same period, since the selection signal SEL is at L level, the gain selection circuit 303 selects the gain ×¼. Hence, in a period from the time t50-1 to a time t52, the comparison circuit 301 generates the comparison result signal CMP indicative of the result of comparison between the signal obtained by multiplying the signal based on the test signal VS1 by the gain ×¼ and the signal based on the reference signal Vr. The count value of the counter 40 generated based on the timing at which the signal value of the comparison result signal CMP is changed is written as a digital signal DN2 in the second memory 503. Also, in a period from a time t54-1 to the time t56, the comparison circuit 301 generates the comparison result signal CMP indicative of the result of comparison between the signal obtained by multiplying the signal based on the test signal VS1 by the gain ×¼ and the signal based on the reference signal Vr. The count value of the counter 40 generated based on the timing at which the signal value of the comparison result signal CMP is changed is written as a digital signal DS2 in the first memory 502.

At the time t56 and later, the horizontal scan circuit 60 transfers the obtained digital signal DN2 and digital signal DS2 to the DSP 90.

The DSP 90 acquires a correction value β and executes correction processing based on the digital signals DN1, DS1, DN2, and DS2 obtained by the above-described correction operation. The acquirement of the correction value β and the correction processing may be similar to those in the third embodiment.

With the above-described configuration and operation, even with the imaging device of this embodiment, an advantage similar to that of the fourth embodiment can be obtained. Further, an error in digital signal due to a variation in gain ratio set by the gain selection circuit 303 can be decreased.

Seventh Embodiment

Figure 18:
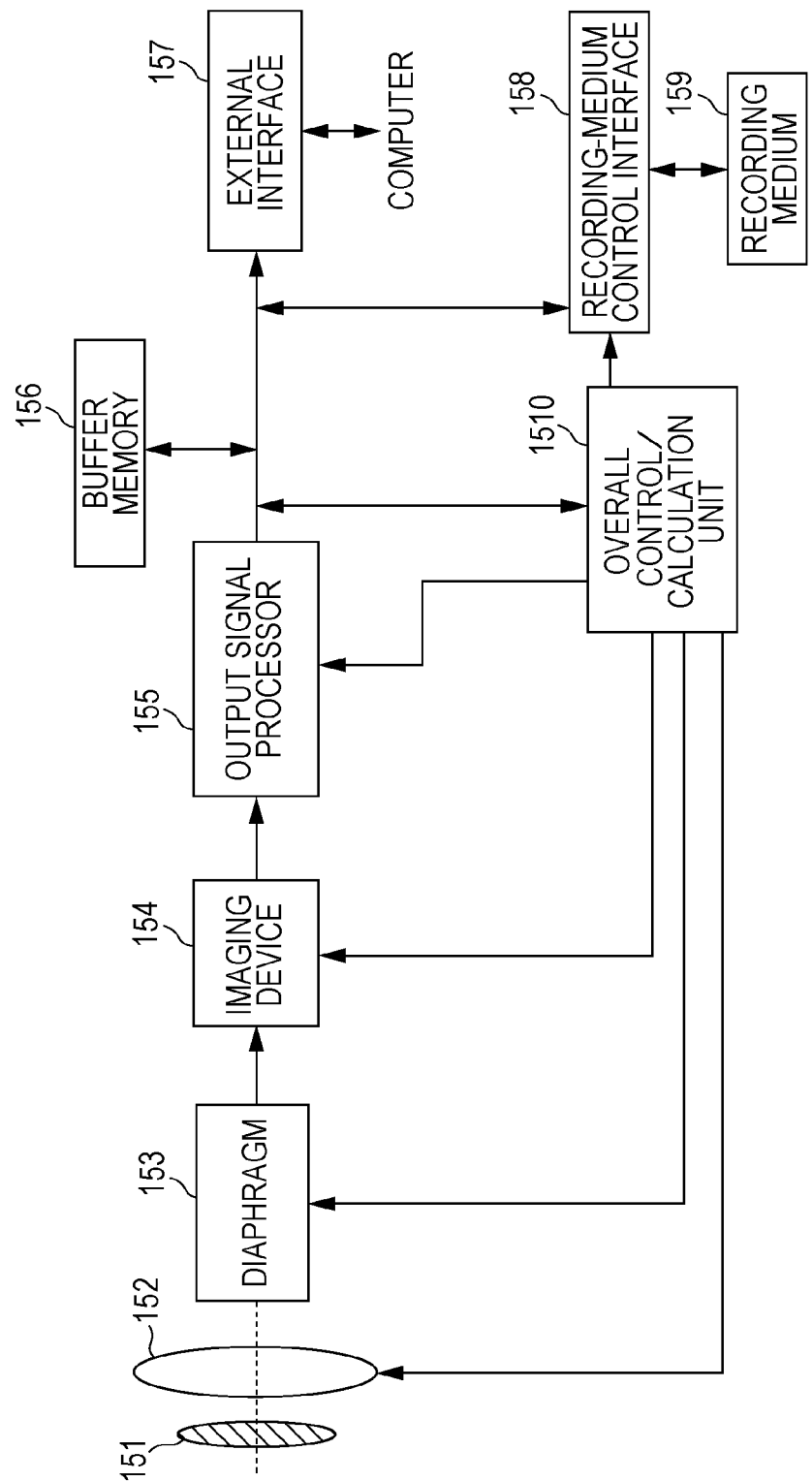
FIG. 18 is a schematic illustration of an example of an imaging system.

FIG. 18 is an imaging system that uses the imaging device described in any of the first to sixth embodiments, as an imaging device 154.

In FIG. 18, the imaging system includes a barrier 151 that protects a lens, a lens 152 that causes an optical image of an object to be focused at the imaging device 154, and a diaphragm 153 that causes the quantity of light passing through the lens 152 to be variable. Further, the imaging system includes an output signal processor 155 that executes processing on a signal output from the imaging device 154. The signal output from the imaging device 154 is an imaging signal for generating an image formed by taking an image of the object. The output signal processor 155 generates an image by executing various correction and compression if required on the imaging signal output from the imaging device 154. The lens 152 and the diaphragm 153 form an optical system that collects light at the imaging device 154.

The imaging system exemplarily illustrated in FIG. 18 further includes a buffer memory 156 that temporarily stores image data, and an external interface 157 that makes communication with an external computer etc. Further, the imaging system includes a recording medium 159, such as a semiconductor memory, which can be removably mounted on the imaging system. Imaging data is recorded on and read from the recording medium. The imaging system also includes a recording-medium control interface 158 that executes recording on and reading from the recording medium 159. Further, the imaging system includes an overall control/calculation unit 1510 that controls various calculations and the entire digital still camera.

In the imaging system shown in FIG. 18, the DSP 90 described in any of the first to sixth embodiments may be included in the output signal processor 155 provided outside the imaging device 154. In this form, the output signal processor 155 serves as a signal processor including a correction unit. Even with this form, the imaging system of this embodiment can provide an advantage similar to the advantage described in any of the first to sixth embodiments. Alternatively, the DSP 90 described in any of the first to sixth embodiments may be included in the overall control/calculation unit 1510 provided outside the imaging device 154. With this form, the overall control/calculation unit 1510 serves as a correction unit.

With the invention, the AD converter compares one of the first and second reference signals, which have different changing quantities of potentials per unit time, with the photoelectric conversion signal. Then, the AD converter compares one of the first and second reference signals, with the noise signal. The imaging device including the AD converter can be realized while decreasing an increase in circuit scale of the AD converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-070544 filed Mar. 28, 2013, No. 2014-016022 filed Jan. 30, 2014, and No. 2014-043112 filed Mar. 5, 2014, which are hereby incorporated by reference herein in their entirety.

What is claimed is:

1. An imaging device comprising:
an analog-signal output unit including a pixel configured to output a photoelectric conversion signal based on incident light; and
an analog-to-digital converter including a comparator,
wherein the comparator executes a first comparison, a second comparison, and a third comparison,
wherein the first comparison is a comparison between a noise signal output from the analog-signal output unit and a first reference signal having a potential that is changed by a first changing quantity per unit time,
wherein the second comparison is a comparison between the noise signal and a second reference signal having a potential that is changed by a second changing quantity per unit time, the second changing quantity being larger than the first changing quantity,
wherein the third comparison is a comparison between one of the first reference signal and the second reference signal, and a signal output from the analog-signal output unit based on the photoelectric conversion signal, and
wherein the analog-to-digital converter generates a digital signal based on a result of the first comparison, a digital signal based on a result of the second comparison, and a digital signal based on a result of the third comparison.

2. The imaging device according to claim 1,
wherein the pixel includes
a photoelectric converter configured to generate a charge based on the incident light, and
a transistor having an input node to which the charge is input, and configured to output the photoelectric conversion signal based on the charge, and
wherein the noise signal is a signal that is output from the transistor based on a reset potential of the input node.

3. The imaging device according to claim 1,
wherein the analog-signal output unit has an input node to which the photoelectric conversion signal is input, and further includes an amplifier configured to amplify a signal input to the input node and output the amplified signal to the comparator, and
wherein the noise signal is a signal that is output from the amplifier based on a reset potential of the input node of the amplifier.

4. An imaging device comprising:
a pixel configured to output a photoelectric conversion signal based on incident light; and
an analog-to-digital converter including a comparator configured to compare a reference signal with a signal that is input to an input node of the comparator,
wherein the comparator executes a first comparison, a second comparison, and a third comparison,
wherein the first comparison is a comparison between a reset potential of the input node of the comparator and a first reference signal having a potential that is changed by a first changing quantity per unit time,
wherein the second comparison is a comparison between the reset potential of the input node of the comparator and a second reference signal having a potential that is changed by a second changing quantity per unit time, the second changing quantity being larger than the first changing quantity,
wherein the third comparison is a comparison between one of the first reference signal and the second reference signal, and a potential of the input node of the comparator based on the photoelectric conversion signal, and
wherein the analog-to-digital converter generates a digital signal based on a result of the first comparison, a digital signal based on a result of the second comparison, and a digital signal based on a result of the third comparison.

5. The imaging device according to claim 1,
wherein the digital signal generated by the analog-to-digital converter based on the result of the first comparison is a first digital signal,
wherein the digital signal generated by the analog-to-digital converter based on the result of the second comparison is a second digital signal,
wherein the analog-to-digital converter further includes a selection circuit,
wherein the analog-to-digital converter generates the first digital signal and the second digital signal, and then the comparator compares a potential of a signal based on the photoelectric conversion signal with a predetermined potential,
wherein, when the potential of the signal based on the photoelectric conversion signal is smaller than the predetermined potential, the selection circuit supplies the first reference signal to the comparator for the third comparison, and
wherein, when the potential of the signal based on the photoelectric conversion signal is larger than the predetermined potential, the selection circuit supplies the second reference signal to the comparator for the third comparison.

6. The imaging device according to claim 5,
wherein the digital signal generated by the analog-to-digital converter based on the result of the third comparison is a third digital signal,
wherein the analog-to-digital converter further includes a first memory and a second memory, and
wherein, after the first memory holds the first digital signal and the second memory holds the second digital signal, the selection circuit causes the second memory to hold the third digital signal while the selection circuit causes the first memory to hold the first digital signal when the potential of the signal based on the photoelectric conversion signal is smaller than the predetermined potential, and the selection circuit causes the first memory to hold the third digital signal while the selection circuit causes the second memory to hold the second digital signal when the potential of the signal based on the photoelectric conversion signal is larger than the predetermined potential.

7. The imaging device according to claim 5, further comprising:
a reference-signal supply unit,
wherein, during the first comparison, the reference-signal supply unit does not supply the second reference signal, but supplies the first reference signal to the comparator through the selection circuit,
wherein, during the second comparison, the reference-signal supply unit does not supply the first reference signal, but supplies the second reference signal to the comparator through the selection circuit, and
wherein, during the third comparison, a period in which the reference-signal supply unit supplies the first reference signal to the selection circuit overlaps a period in which the reference-signal supply unit supplies the second reference signal to the selection circuit.

8. The imaging device according to claim 1, further comprising:
a correction unit,
wherein the analog-to-digital converter generates a fourth digital signal based on a result of comparison between a first analog signal and the first reference signal by the comparator,
wherein the analog-to-digital converter generates a fifth digital signal based on a result of comparison between the first analog signal and the second reference signal by the comparator,
wherein the analog-to-digital converter generates a sixth digital signal based on a result of comparison between a second analog signal and the first reference signal by the comparator, the second analog signal having a signal value different from a signal value of the first analog signal,
wherein the analog-to-digital converter generates a seventh digital signal based on a result of comparison between the second analog signal and the second reference signal by the comparator, and
wherein the correction unit corrects a third digital signal, which is the digital signal generated by the analog-to-digital converter based on the result of the third comparison, the correction being based on a difference between a signal value of the fourth digital signal and a signal value of the sixth digital signal and a difference between a signal value of the fifth digital signal and a signal value of the seventh digital signal.

9. The imaging device according to claim 8, further comprising:
a test-signal supply unit,
wherein the test-signal supply unit outputs the first analog signal and the second analog signal to the comparator.

10. The imaging device according to claim 8,
wherein the correction unit corrects the third digital signal by multiplying the third digital signal by a correction value $\beta$, which is obtained by an expression as follows, $$\beta=(DS1-DN1)/(G\times(DS2-DN2)),$$

where DN1 is the signal value of the fourth digital signal, DN2 is the signal value of the fifth digital signal, DS1 is the signal value of the sixth digital signal, DS2 is the signal value of the seventh digital signal, and G is a ratio of the second changing quantity to the first changing quantity.

11. The imaging device according to claim 8,
wherein the imaging device comprises a plurality of the pixels and a plurality of the analog-to-digital converters,
wherein the plurality of pixels are the pixels in a plurality of columns,
wherein the plurality of analog-to-digital converters are provided in correspondence with the respective columns having the pixels arranged therein, and each of the plurality of analog-to-digital converters generates the fourth digital signal, the fifth digital signal, the sixth digital signal, and the seventh digital signal, and
wherein the correction unit corrects the third digital signal generated by each of the plurality of analog-to-digital converters based on an average value of differences between signal values of the fourth digital signals and signal values of the sixth digital signals of the plurality of analog-to-digital converters and an average value of differences between signal values of the fifth digital signals and signal values of the seventh digital signals of the plurality of analog-to-digital converters.

12. An imaging system comprising:
the imaging device according to claim 1; and
a signal processor configured to process a signal output from the imaging device,
wherein, when the analog-to-digital converter executes the third comparison by using the first reference signal, the signal output unit generates a signal of a difference between the digital signal generated by the third comparison and the digital signal generated by the first comparison, and
wherein, when the analog-to-digital converter executes the third comparison by using the second reference signal, the signal output unit generates a signal of a difference between the digital signal generated by the third comparison and the digital signal generated by the second comparison.

13. An imaging system comprising:
the imaging device according to claim 1; and
a signal processor configured to process a signal output from the imaging device.

14. A driving method of an imaging device, the imaging device including an analog-signal output unit including a pixel configured to output a photoelectric conversion signal based on incident light, and an analog-to-digital converter including a comparator, the method comprising:
a first step of causing the comparator to compare a noise signal output from the analog-signal output unit with a first reference signal having a potential that is changed by a first changing quantity per unit time;
a second step of causing the comparator to compare the noise signal with a second reference signal having a potential that is changed by a second changing quantity per unit time, the second changing quantity being larger than the first changing quantity; and a third step of causing the comparator to compare one of the first reference signal and the second reference signal with a signal based on the photoelectric conversion signal.

15. The driving method of the imaging device according to claim 14, wherein the analog-to-digital converter further includes a first memory and a second memory, wherein during the first step, the analog-to-digital converter is caused to generate a first digital signal based on a result of the comparison by the comparator, and the first memory is caused to hold the first digital signal, wherein during the second step, the analog-to-digital converter is caused to generate a second digital signal based on a result of the comparison by the comparator, and the second memory is caused to hold the second digital signal, wherein during the third step, the analog-to-digital converter is caused to generate a third digital signal based on a result of the comparison by the comparator, wherein, when a potential of the signal based on the photoelectric conversion signal is smaller than a predetermined potential, the second memory is caused to hold the third digital signal while the first memory is caused to hold the first digital signal, and wherein, when the potential of the signal based on the photoelectric conversion signal is larger than the predetermined potential, the first memory is caused to hold the third digital signal while the second memory is caused to hold the second digital signal.

16. The driving method of the imaging device according to claim 15, wherein the imaging device further includes a selection circuit, wherein, during the first step, the selection circuit does not supply the second reference signal to the comparator, but supplies the first reference signal to the comparator, wherein, during the second step, the selection circuit does not supply the first reference signal to the comparator, but supplies the second reference signal to the comparator, and wherein, during the third step, the first reference signal and the second reference signal are supplied to the selection circuit in parallel, the selection circuit selects the first reference signal from among the first and second reference signals and supplies the first reference signal to the comparator when the potential of the signal based on the photoelectric conversion signal is smaller than the predetermined potential, and the selection circuit selects the second reference signal from among the first and second reference signals and supplies the second reference signal to the comparator when the potential of the signal based on the photoelectric conversion signal is larger than the predetermined potential.

17. The driving method of the imaging device according to claim 14, wherein the analog-to-digital converter is caused to generate a fourth digital signal based on a result of comparison between a first analog signal and the first reference signal by the comparator, wherein the analog-to-digital converter is caused to generate a fifth digital signal based on a result of comparison between the first analog signal and the second reference signal by the comparator, wherein the analog-to-digital converter is caused to generate a sixth digital signal based on a result of comparison between a second analog signal and the first reference signal by the comparator, the second analog signal having a signal value different from a signal value of the first analog signal, wherein the analog-to-digital converter is caused to generate a seventh digital signal based on a result of comparison between the second analog signal and the second reference signal by the comparator, and wherein, in the comparison between the one of the first reference signal and the second reference signal, and the signal based on the photoelectric conversion signal by the comparator, based on a result of the comparison by the comparator, a digital signal generated by the analog-to-digital converter is corrected based on a difference between a signal value of the fourth digital signal and a signal value of the sixth digital signal, and a difference between a signal value of the fifth digital signal and a signal value of the seventh digital signal.

* * * * *